(12) United States Patent
Castro et al.

(10) Patent No.: US 12,401,728 B2
(45) Date of Patent: *Aug. 26, 2025

(54) PUSH NOTIFICATION MANAGEMENT

(71) Applicant: Snap Inc., Santa Monica, CA (US)

(72) Inventors: Alex Joseph Castro, Cypress, CA (US); Michael Brian Murray, Marina del Rey, CA (US); William Wu, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/525,658

(22) Filed: Nov. 30, 2023

(65) Prior Publication Data

US 2024/0098158 A1 Mar. 21, 2024

Related U.S. Application Data

(63) Continuation of application No. 18/104,628, filed on Feb. 1, 2023, now Pat. No. 11,838,380, which is a
(Continued)

(51) Int. Cl.
*G06F 15/16* (2006.01)
*G06F 9/54* (2006.01)
(Continued)

(52) U.S. Cl.
CPC .............. *H04L 67/55* (2022.05); *H04L 51/04* (2013.01); *H04L 51/224* (2022.05); *H04L 51/52* (2022.05)

(58) Field of Classification Search
CPC ......... H04L 67/26; H04L 51/04; H04L 51/24; H04L 51/32; H04L 67/55; H04L 51/224; H04L 51/52
(Continued)

(56) References Cited

U.S. PATENT DOCUMENTS 6,038,295 A 3/2000 Mattes
6,980,909 B2 12/2005 Root et al.
(Continued)

FOREIGN PATENT DOCUMENTS

CA 2887596 A1 7/2015

OTHER PUBLICATIONS

"U.S. Appl. No. 15/837,946, 312 Amendment filed Jan. 10, 2023", 7 pgs.
(Continued)

*Primary Examiner* — Hamza N Algibhah
(74) *Attorney, Agent, or Firm* — Schwegman Lundberg & Woessner, P.A.

(57) ABSTRACT

A push notification mechanism at a mobile user device provides for automated limiting of the rate of production of push notification alerts (such as an audible alert or a vibratory alert) and/or push notifications responsive to the occurrence of chat events relevant to a chat application hosted by the user device. Some chat events automatically trigger suppression periods during which push notification alerts are prevented for subsequent chat events that satisfy predefined suppression criteria. Such push notification and/or alert limiting can be performed separately for separate users, chat groups, and/or chat event types.

19 Claims, 18 Drawing Sheets

Related U.S. Application Data continuation of application No. 15/837,946, filed on Dec. 11, 2017, now Pat. No. 11,588,913.

(60) Provisional application No. 62/432,679, filed on Dec. 11, 2016.

(51) Int. Cl.
| | | |
|---|---|---|
| *H04L 29/06* | (2006.01) | |
| *H04L 51/04* | (2022.01) | |
| *H04L 51/224* | (2022.01) | |
| *H04L 51/52* | (2022.01) | |
| *H04L 67/55* | (2022.01) | |

(58) Field of Classification Search
USPC .......................................................... 709/206
See application file for complete search history.

(56) References Cited

U.S. PATENT DOCUMENTS

| | | | |
|---|---|---|---|
| 7,173,651 B1 | 2/2007 | Knowles | |
| 7,411,493 B2 | 8/2008 | Smith | |
| 7,535,890 B2 | 5/2009 | Rojas | |
| 8,131,597 B2 | 3/2012 | Hudetz | |
| 8,199,747 B2 | 6/2012 | Rojas et al. | |
| 8,332,475 B2 | 12/2012 | Rosen et al. | |
| 8,718,333 B2 | 5/2014 | Wolf et al. | |
| 8,724,622 B2 | 5/2014 | Rojas | |
| 8,862,676 B1* | 10/2014 | Bilinski | H04L 51/224 |
| | | | 709/200 |
| 8,874,677 B2 | 10/2014 | Rosen et al. | |
| 8,909,679 B2 | 12/2014 | Root et al. | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,100,806 B2 | 8/2015 | Rosen et al. | |
| 9,100,807 B2 | 8/2015 | Rosen et al. | |
| 9,137,049 B2* | 9/2015 | Varoglu | H04L 51/224 |
| 9,191,776 B2 | 11/2015 | Root et al. | |
| 9,204,252 B2 | 12/2015 | Root | |
| 9,443,227 B2 | 9/2016 | Evans et al. | |
| 9,473,428 B1* | 10/2016 | Koum | H04L 51/046 |
| 9,489,661 B2 | 11/2016 | Evans et al. | |
| 9,491,134 B2 | 11/2016 | Rosen et al. | |
| 9,503,409 B2* | 11/2016 | Heiby | H04W 4/20 |
| 10,033,673 B1* | 7/2018 | Phanshikar | H04L 51/04 |
| 10,135,768 B2* | 11/2018 | Shin | H04L 51/214 |
| 10,135,941 B2* | 11/2018 | DeLuca | H04W 4/14 |
| 10,587,749 B2* | 3/2020 | Drake | H04W 4/90 |
| 11,588,913 B1 | 2/2023 | Castro et al. | |
| 2008/0096597 A1 | 4/2008 | Vempati et al. | |
| 2009/0002127 A1* | 1/2009 | Kraft | H04M 1/72403 |
| | | | 340/7.52 |
| 2011/0202598 A1 | 8/2011 | Evans et al. | |
| 2011/0298614 A1 | 12/2011 | Bells | |
| 2012/0072844 A1* | 3/2012 | Lefrancois des Courtis | |
| | | | G06Q 30/02 |
| | | | 709/204 |
| 2012/0209924 A1 | 8/2012 | Evans et al. | |
| 2014/0082093 A1 | 3/2014 | Savage | |
| 2014/0173430 A1 | 6/2014 | Clavel et al. | |
| 2014/0241517 A1 | 8/2014 | Varoglu et al. | |
| 2014/0244714 A1 | 8/2014 | Heiby | |
| 2014/0289644 A1 | 9/2014 | Clarke et al. | |
| 2014/0370857 A1* | 12/2014 | Bovis | H04M 3/436 |
| | | | 455/414.1 |
| 2015/0121412 A1* | 4/2015 | McRae | H04N 21/485 |
| | | | 725/25 |
| 2015/0379224 A1* | 12/2015 | Rosen | A61B 5/0002 |
| | | | 705/2 |
| 2016/0112358 A1* | 4/2016 | Ghafourifar | H04L 51/212 |
| | | | 709/206 |
| 2016/0164810 A1* | 6/2016 | Wolz | H04L 51/224 |
| | | | 709/206 |
| 2016/0315902 A1 | 10/2016 | Silva et al. | |
| 2017/0272568 A1* | 9/2017 | Bovis | H04W 4/027 |
| 2017/0374075 A1* | 12/2017 | Boval | H04L 63/083 |
| 2018/0081514 A1* | 3/2018 | Bostick | H04L 51/224 |
| 2019/0104097 A1* | 4/2019 | Lalka | G06Q 30/0261 |
| 2020/0327559 A1* | 10/2020 | Sharma | H04L 63/10 |
| 2023/0179677 A1 | 6/2023 | Castro et al. | |

OTHER PUBLICATIONS

"U.S. Appl. No. 15/837,946, Final Office Action mailed Mar. 25, 2021", 22 pgs.

"U.S. Appl. No. 15/837,946, Final Office Action mailed Apr. 6, 2022", 24 pgs.

"U.S. Appl. No. 15/837,946, Non Final Office Action mailed Aug. 6, 2021", 24 pgs.

"U.S. Appl. No. 15/837,946, Non Final Office Action mailed Aug. 27, 2020", 22 pgs.

"U.S. Appl. No. 15/837,946, Non Final Office Action mailed Dec. 30, 2019", 27 pgs.

"U.S. Appl. No. 15/837,946, Notice of Allowance mailed Oct. 13, 2022", 6 pgs.

"U.S. Appl. No. 15/837,946, PTO Response to Rule 312 Communication mailed Jan. 24, 2023".

"U.S. Appl. No. 15/837,946, Response filed Jan. 6, 2022 to Non Final Office Action mailed Aug. 6, 2021", 11 pgs.

"U.S. Appl. No. 15/837,946, Response filed Apr. 30, 2020 to Non Final Office Action mailed Dec. 30, 2019", 11 pgs.

"U.S. Appl. No. 15/837,946, Response filed Jun. 25, 2021 to Final Office Action mailed Mar. 25, 2021", 11 pages.

"U.S. Appl. No. 15/837,946, Response filed Aug. 8, 2022 to Final Office Action mailed Apr. 6, 2022", 12 pgs.

"U.S. Appl. No. 15/837,946, Response filed Dec. 28, 2020 to Non Final Office Action mailed Aug. 27, 2020", 12 pgs.

"U.S. Appl. No. 18/104,628, Corrected Notice of Allowability mailed Nov. 6, 2023", 9 pgs.

"U.S. Appl. No. 18/104,628, Notice of Allowance mailed Jul. 26, 2023", 12 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

* cited by examiner

PUSH NOTIFICATION MANAGEMENT

PRIORITY

This application is a continuation of U.S. patent application Ser. No. 18/104,628, filed on Feb. 1, 2023, and issued as U.S. Pat. No. 11,838,380, which is a continuation of U.S. patent application Ser. No. 15/837,946, filed on Dec. 11, 2017, and issued as U.S. Pat. No. 11,588,913, which claims the benefit of priority to U.S. Provisional Patent Application Ser. No. 62/432,679, filed on Dec. 11, 2016, the benefit of priority of each of which is claimed hereby, and each of which are incorporated by reference herein in their entireties.

BACKGROUND

Social media applications, such as chat applications, executing on mobile electronic devices often provide for push notifications indicating occurrence of new social media events relevant to the application. For example, in a chat application, push notifications may be generated with respect to chat events in a group chat. These push notifications often take the form of a user interface element displayed on a screen of the electronic device, such as a banner alert displayed on a lock screen of a mobile phone.

Many such applications provide for production of alerts generated by the user device associated with new push notifications. Such push notification alerts often take the form of an audible indication (such as a ping), a tactile indication (such as a phone vibration or buzz), and/or a visual indication separate from the push notification itself (such as an LED flash).

BRIEF DESCRIPTION OF THE DRAWINGS

Some aspects of the disclosure are illustrated in the appended drawings. Note that the appended drawings illustrate example embodiments of the present disclosure and cannot be considered as limiting the scope of the disclosure.

Figure 1:
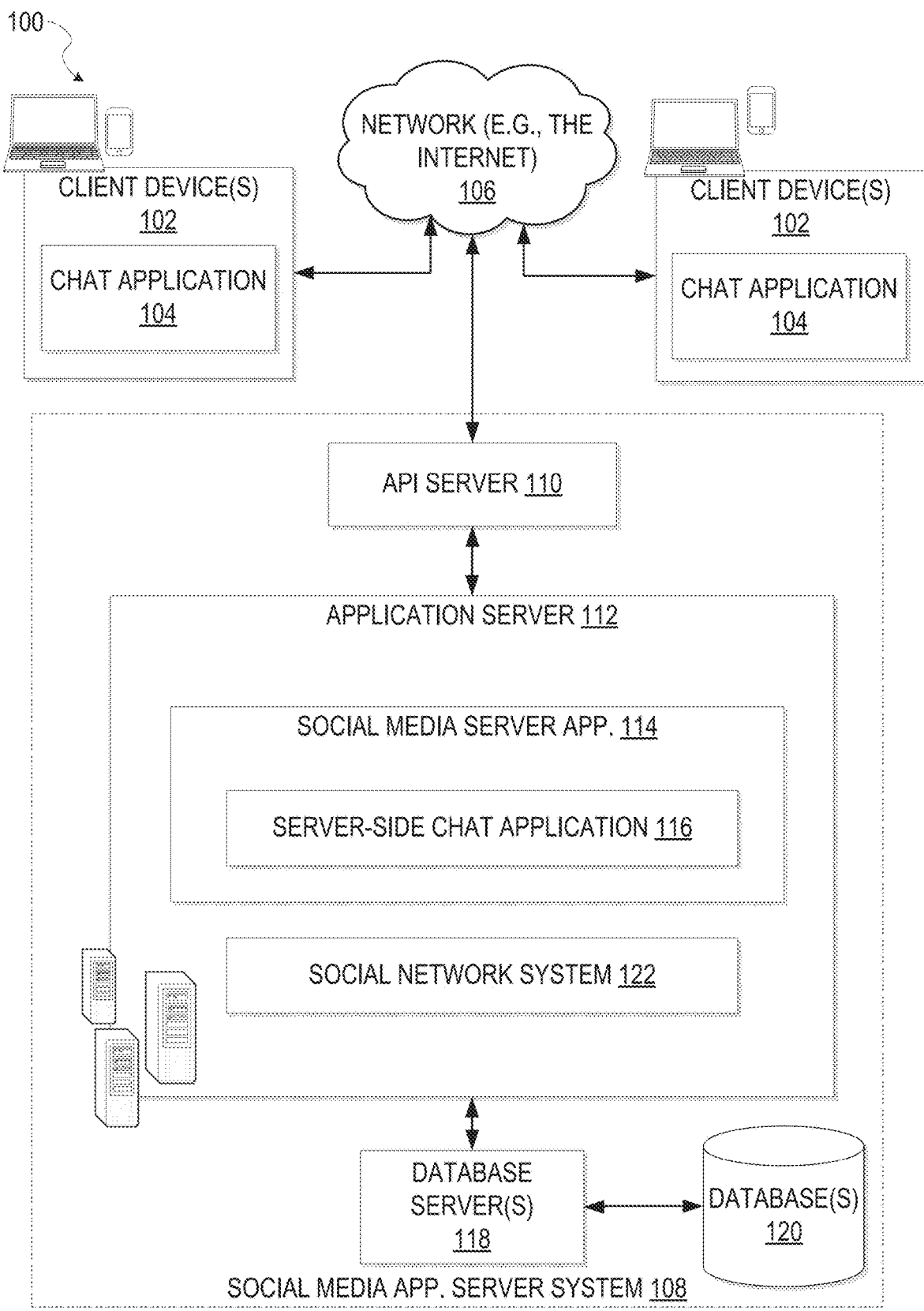
FIG. 1 is a schematic block diagram illustrating a networked system for providing a social media platform that provides chat functionality among multiple users using different respective user devices, according to an example embodiment.

The headings provided herein are merely for convenience and do not necessarily affect the scope or meaning of the terms used.

Overview

One aspect of the disclosure provides for automated management of push notification alerts on a mobile electronic device. In some embodiments, push notification alerts for a chat application executing on the mobile electronic device are managed such that push notification alerts are suppressed for at least some chat events.

With suppression of a push notification alert is meant that a push notification is generated without generating a corresponding push notification alert, wherein non-generation of the push notification alert is based on predefined criteria using dynamically changing conditions or variables, so that a push notification alert can in different circumstances be generated for a push notification triggered by an identical event. Although the description that follows, including the example embodiments, describe the suppression of push notification alerts without dynamically limiting or suppressing the generation of push notifications, other embodiments may provide instead or in addition for dynamic limiting of push notifications themselves (e.g., to the display of banner alerts on a mobile phone lock screen), in which case the disclosed alert limiting/suppression techniques are to be understood as applying mutatis mutandis to the limiting/suppression of push notifications.

The disclosure thus in some embodiments provide for a method of or a system configured to:
  provide a push notification service on a user device hosting a social media application, the push notification mechanism being configured to automatically generate respective push notification alerts in response to receiving, while the user device is in an inactive mode, notification of social media events pertaining to the social media application, each push notification alert comprising an audible, a tactile, and/or light flash indication generated by the user device; and
  an alert limiting mechanism configured to dynamically limit push notification alerts based on predefined alert suppression criteria, such that respective push notification alerts are suppressed for at least some of the social media events.

With an inactive mode of the user device is meant a mode of the device in which there is no active engagement between a user and an application or native functionality of the user device. In some embodiments, a display screen of the user device in the inactive mode displays either a lock screen or is switched off. In some embodiments, triggering of a push notification when the screen is off causes display of the push notification on the lock screen.

In some embodiments, the social media application is a chat application enabling communication of chat messages with different users and/or chat groups, the social media events being chat events. The term chat application includes not only applications that provide exclusively chat functionality, but also includes applications that provide chat functionality in addition to one or more other functionalities, e.g., allowing users to post status updates and messages to a social media platform for consumption by a friend network. In this context, chat notification alerts typically comprise an audible or vibrational indication that a new chat event has occurred. Such chat events may include one or more of the following:

a typing push, being a push notification alerting the user that another user in the chat application has begun typing a new message;

a new content push, being a push notification of that alerts the user of new content in the chat application, e.g. indicating a new chat message submitted to a group chat;

status message push notifications, being a set of push notifications that describe a status message in the chat application. In some embodiments, such status message pushes may include:

a screenshot push notification, being a push notification that is sent when another user takes a screenshot of an item in a chat;

a replay push notification, being a push notification of that is sent when another user replays a media content item in the chat application;

a rename push notification, being a push notification of that is sent when another user renames a chat; and an add participant push, being a push notification sent when another user adds a friend to a particular chat.

In one embodiment, a time-based limitation is imposed on push notification alerts. In such instances, an initial chat event (also referred to herein as a suppression trigger event) triggers a push notification alert and initiates an alert suppression timer that causes suppression of further push notification alerts for at least some subsequent chat events within a predetermined suppression period. In one example embodiment, a suppression period of 20 minutes is automatically triggered by the suppression trigger event.

In some embodiments, a single suppression period is applicable at any particular time, and suppresses alerts for subsequent push notifications in a manner agnostic to the particular persons, chat groups, or new content types to which the subsequent push notifications pertain, so that no more than a single push notification alert is executed by the mobile electronic device within, e.g., the 20 minute suppression period. It will be appreciated that different embodiments may employ different suppression periods or intervals In other embodiments, a particular suppression period may be person-, group-, or content type-specific. In some such embodiments, a plurality of different suppression periods may be maintained simultaneously. A number of different example embodiments for limiting push notification alerts will be described later herein with reference to FIGS. 5A-5D.

Another aspect of the disclosure provides for a method, system, and mobile electronic device that implements push notification batching. Current chat applications typically generate a separate push notification for each chat event in chat applications executing on mobile electronic devices. Such push notifications typically comprise a push notification banner displayed on a screen of a mobile electronic device, for example being displayed on a lock screen when the mobile device is in an inactive mode. This aspect of the disclosure serves to avoid cluttering of a mobile device lock screen or notification center with multiple separate push notifications for separate chat events forming part of a common chat group.

To this end, some example embodiments provides for coalescing multiple push notifications into a common user interface element, e.g., a common banner notification.

In some embodiments, push notification batching as described herein may be performed in combination with rate limiting of push notifications and/or push notification alerts. Other embodiments provide for push notification batching in combination with conventional production of push notification alerts. Yet further embodiments provide for limiting of push notifications and/or push notification alerts, as described herein, without implementing push notification batching.

It will thus be seen that a benefit of the discussed example embodiments is to reduce the volume or rate of push notification alerts for chat applications on a mobile electronic device, thus reducing the invasiveness of such alerts and improving functioning of the device. In existing chat applications that employ push notification alerts (including, for example, banner alerts on a lock screen and associated buzzes, things, or LED flashes indicating the occurrence of a chat event), each such event typically triggers a corresponding push notification alert and/or banner notification on the mobile electronic device lock screen. A proliferation of such push notification, particularly in an active chat sessions, can be disruptive and invasive. The disclosed techniques for limiting push notification alerts in chat sessions thus serve to make such chat applications less invasive and reduce user irritation and disturbance.

Moreover, push notification alerts typically consume considerable power, when produced in volume. By limiting the frequency of push notification alert production, without adversely affecting the effectiveness of push notification alerts (to the contrary, improving the effectiveness of push notification alerts), the functioning of a mobile device implementing the disclosed techniques is improved by extended battery life.

DETAILED DESCRIPTION

The description that follows includes devices, systems, methods, techniques, instruction sequences, and computing machine program products that embody illustrative embodiments of the disclosure. In the following description, for the purposes of explanation, numerous specific details are set forth in order to provide an understanding of various embodiments of the disclosed subject matter. It will be evident, however, to those skilled in the art, that embodiments of the disclosed subject matter may be practiced without these specific details. In general, well-known instruction instances, protocols, structures, and techniques are not necessarily shown in detail.

First, a network architecture and environment within which certain aspects of the disclosure may be implemented will be described with reference to FIGS. 1 and 2, after which various features of the disclosure will be described in greater detail with reference to FIGS. 3-8. Finally, an example software architecture and machine that can be used for implemented various aspects of the disclosure will be described with reference to FIGS. 9 and 10.

System Architecture and Operating Environment

FIG. 1 is a block diagram showing an example social media platform system 100 for exchanging data (e.g., social media items or messages and associated content) over a network. In this description, items communicated from one user to one or more other users via a social media application or platform, as well as items uploaded or provided by users to a social media application or platform for availability to or consumption by other users via the social media application or platform, are referred to as messages. In this particular example embodiment, the social media platform system 100 is configured to provide chat functionality allowing multiple users to communicate via a common chat platform. As will be described further below, the system 100 further provides for push notifications to alert users of the occurrence of new events on the chat platform that are relevant to the respective users.

The social media platform system 100 includes multiple client devices 102 (also referred to herein as user devices), each of which hosts a number of applications including a chat application 104. In some embodiments, the chat application 104 is provided by or forms part of a client-side social media application that provides at least some social media functionalities additional to the chat functionalities described herein. Each chat application 104 is communicatively coupled to other instances of the chat application 104 and a social media application server system 108 via a network 106 (e.g., the Internet).

Accordingly, each chat application 104 is able to communicate and exchange data with another chat application 104 and with the social media application server system 108 via the network 106. The data exchanged between social media client applications 104, and between a chat application 104 and the social media application server system 108, includes functions (e.g., commands to invoke functions) as well as payload data (e.g., text, audio, video, or other multimedia data).

The social media application server system 108 provides server-side functionality via the network 106 to a particular chat application 104. While certain functions of the social media platform system 100 are described herein as being performed by either a chat application 104 or by the social media application server system 108, it will be appreciated that the location of a certain functionality either within the chat application 104 or the social media application server system 108 is a design choice. For example, it may be technically preferable to initially deploy certain technology and functionality within the social media application server system 108, but to later migrate this technology and functionality to the chat application 104 where a client device 102 has a sufficient processing capacity.

The social media application server system 108 supports various services and operations that are provided to the chat application 104. Such operations include transmitting data to, receiving data from, and processing data generated by the chat application 104. This data may include message content, client device information, geolocation information, media annotation and overlays, message content persistence conditions, social network information, and live event information, as examples. Data exchanges within the social media platform system 100 are invoked and controlled through functions available via user interfaces (UIs) of the chat application 104. In particular example embodiments, the social media application server system 108 communicates to the respective chat applications 104 indications on notifications of the occurrence of chat events that may trigger push notifications, as described elsewhere herein. In some embodiments, the throttling or limiting of push notifications and/or push notification alerts is performed serverside, by the social media application server system 108. In other embodiments, the throttling or limiting of push notifications and/or push notification alerts is performed clientside, by the chat application 104. In yet further embodiments, such throttling or limiting is performed cooperatively by the chat applications 104 and a server-side Application 116 executing on the social media application server system 108.

Turning now specifically to the social media application server system 108, an Application Program Interface (API) server 110 is coupled to, and provides a programmatic interface to an application server 112. The application server 112 is communicatively coupled to a database server 118, which facilitates access to a database 120 in which is stored data associated with messages processed by the application server 112.

Dealing specifically with the API server 110, this server receives and transmits message data (e.g., commands and message payloads) between the client device 102 and the application server 112. Specifically, the API server 110 provides a set of interfaces (e.g., routines and protocols) that can be called or queried by the chat application 104 in order to invoke functionality of the application server 112. The API server 110 exposes various functions supported by the application server 112, including account registration; login functionality; the sending of messages, via the application server 112, from a particular chat application 104 to another chat application 104; the sending of media files (e.g., images or video) from a chat application 104 to the social media server application 114, and for possible access by another chat application 104; the setting of a collection of media data (e.g., a story or gallery); the retrieval of a list of friends of a user of a client device 102; the retrieval of such collections; the retrieval of messages and content; the adding and deletion of friends to a social graph; the location of friends within a social graph; the coming location or notification of the occurrence of chat events for the triggering of push notifications; and opening an application event (e.g., relating to the chat application 104).

The application server 112 hosts a number of applications and subsystems, including a social media server application 114, a server-side chat application 116 (in this example embodiment forming part of the social media server application 114), and a social network system 122. The social media server application 114 implements a number of message processing technologies and functions particularly related to the aggregation and other processing of content (e.g., textual and multimedia content) included in messages received from multiple instances of the chat application 104. Other processor and memory intensive processing of data may also be performed server-side by the social media server application 114, in view of the hardware requirements for such processing.

The social network system 122 supports various social networking functions and services and makes these functions and services available to the social media server application 114. To this end, the social network system 122 maintains and accesses an entity graph within the database 120. Examples of functions and services supported by the social network system 122 include the identification of other users of the social media platform system 100 with whom a particular user has relationships or is "following." In particular example embodiments, the social network system 122 may additionally store information regarding the identity of users in multiple different chat groups, for example including a list of chat groups of which each user is a member. It will be appreciated that a chat group is a set of three or more users able to access and contribute to a common chat board or thread for the respective chat group. In some embodiments, messages contributed by respective users to the chat platform are ephemeral messages, each ephemeral message having a predefined limited availability period after which the message is made unavailable for viewing via the chat applications 104 of other users.

The application server 112 is communicatively coupled to a database server 118, which facilitates access to a database 120 in which is stored data associated with messages processed by the social media server application 114.

Figure 2:
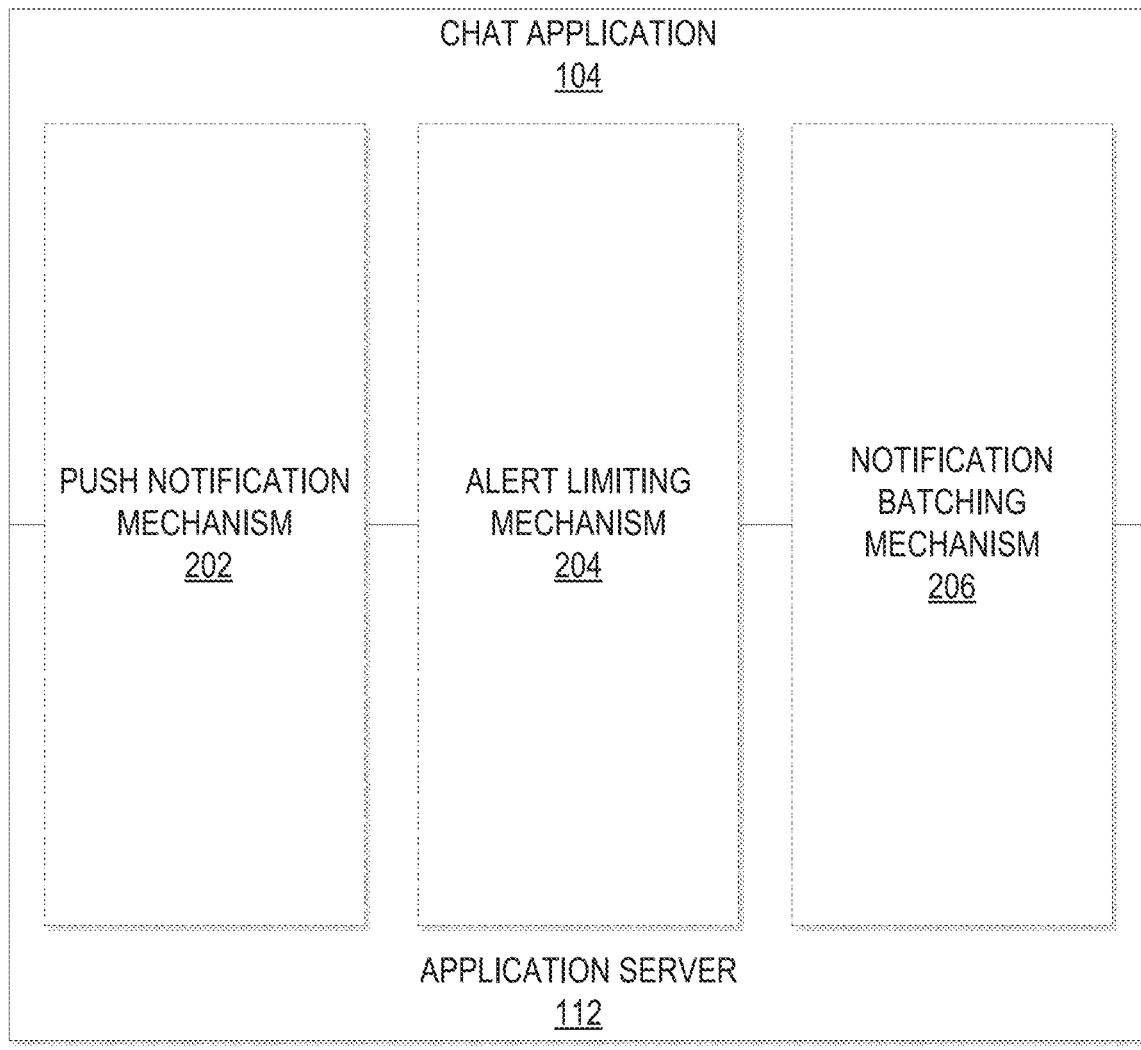
FIG. 2 is a schematic diagram illustrating a network architecture for providing a social media platform, according to an example embodiment.

FIG. 2 is block diagram illustrating further details regarding the social media platform system 100, according to example embodiments. Specifically, the social media platform system 100 is shown to comprise the chat application 104 and the application server 112, which in turn embody a number of subsystems. These subsystems include, but are not limited to, a push notification mechanism 202, an alert limiting mechanism 204, and a notification batching mechanism 206. The functionalities of these mechanisms will be evident from the description that follows.

Example Mobile Device Architecture

Figure 3:
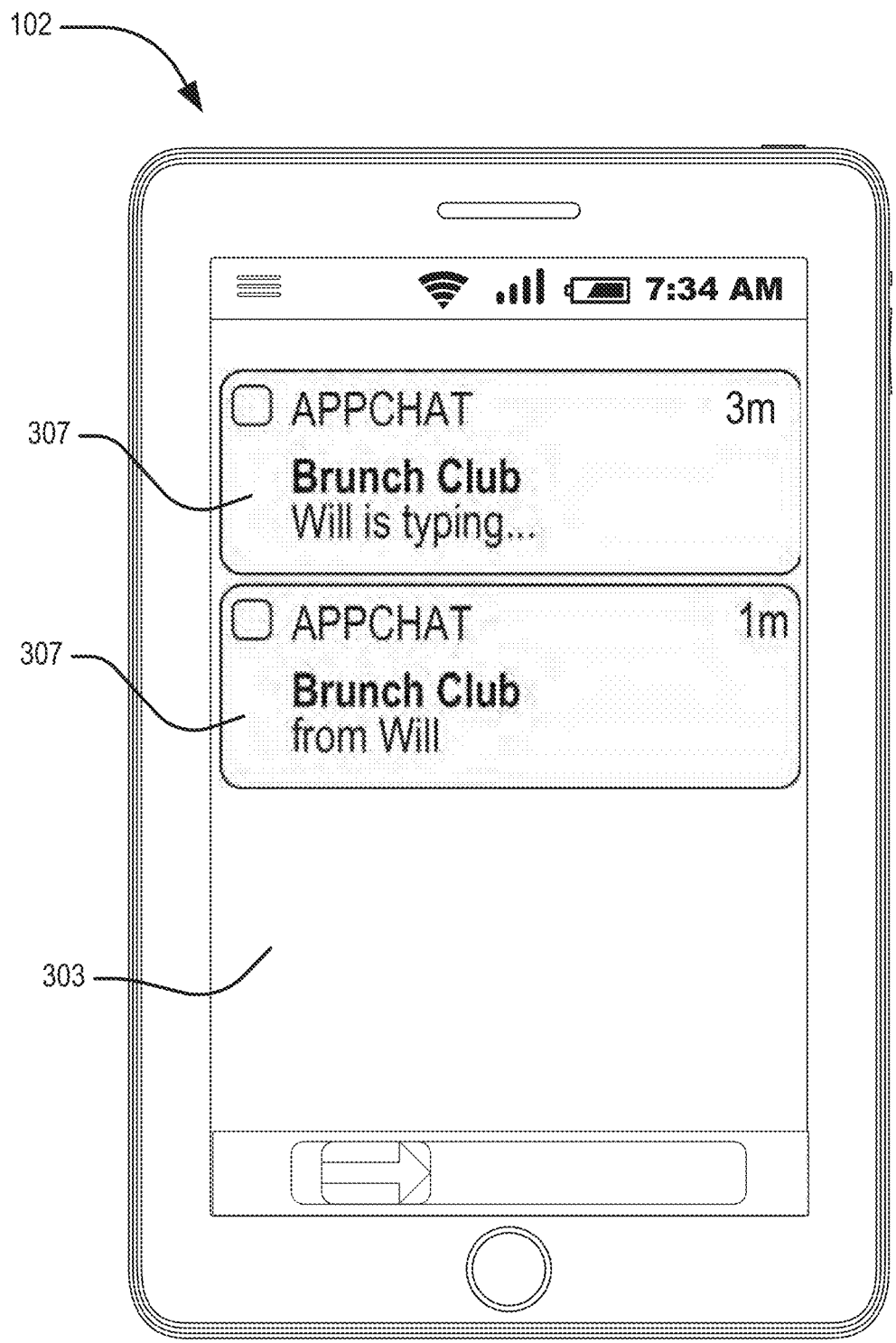
FIG. 3 is a schematic front view of a mobile user device in the example embodiment of a mobile phone displaying a number of push notifications on a lock screen, according to an example embodiment.

FIG. 3 shows a mobile user device 102 in the example form of a mobile phone on which is hosted a client chat application 104 as described previously. The chat application 104 on the user device 102 utilizes a native notification center provided by operating software of the user device 102 to display push notifications 307 on a display screen in the example form of a touchscreen 303. In this example embodiment, the push notification mechanism 202 thus provided by the user device 102 is configured to push notifications 307 in the example form of notification banners such as the pair of example push notifications 307 shown in FIG. 3.

In this example embodiment, such push notifications 307 are displayed outside of the chat application 104 (with which is meant that the push notifications 307 are displayed when a user interface of the chat application 104 is not displayed on the touchscreen 303) both when a different application is a currently displayed on the touchscreen 303 and when the device 102 is in an inactive mode (in which the touchscreen 303 is either off or displays a lock screen). In other example embodiments, push notifications 307 with respect to the chat application 104 may be surfaced on the touchscreen 303 also when a user interface for the chat application 104 is displayed on the touchscreen 303 (i.e., being the currently active application on the device 102), but in the example embodiments described below, the push notification mechanism 202 does not provide for in-app notifications.

Figure 4:
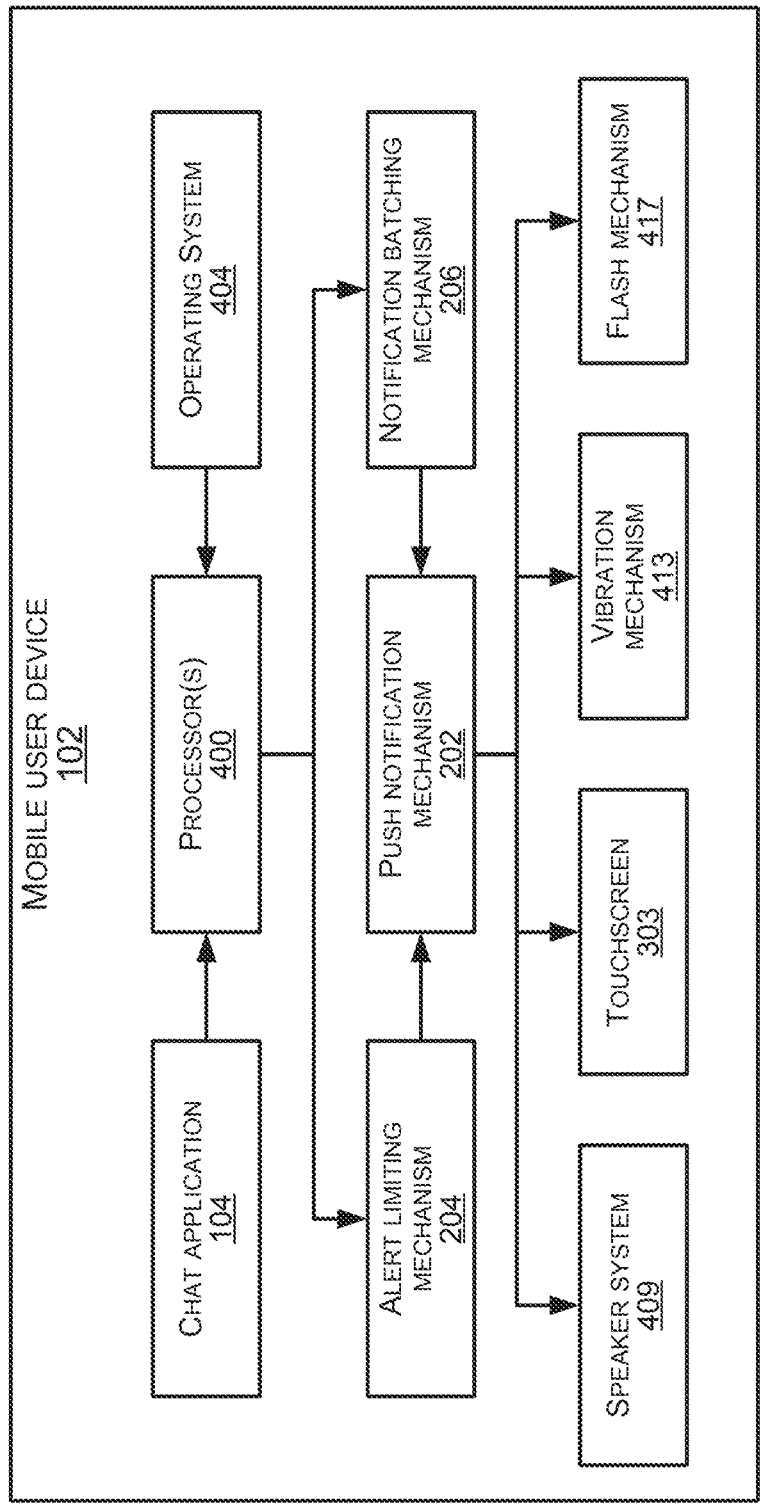
FIG. 4 is a schematic block diagram of a mobile user device configured to provide dynamic limiting of push notification alerts, according to an example embodiment.

FIG. 4 shows a schematic view of selected functional components of the mobile user device 102. The device 102 includes one or more computer processors 400 and memory storing, inter alia, the client-side chat application 104 and a native operating system 404 of the device 102. The previously described alert limiting mechanism 204, push notification mechanism 202, and notification batching mechanism 206 are in this example embodiment instantiated by execution of the chat application 104 (in some embodiments partly by the operating system 404) on the processor 400. As discussed previously, these mechanisms 202-206 may in other embodiments be provided in a different manner, e.g. being provided at least in part by server-side functionalities.

The mobile user device further includes a speaker system 409 usable by the push notification mechanism 202 to generate an audible push notification alert by playing a particular alert tone synchronous with the display of push notifications 307 on the touchscreen 303. The device 102 further includes a vibration mechanism 413 usable by the push notification mechanism 202 to produce a tactile push notification alert in the form of a vibration or series of vibrations induced in a body of the mobile user device 102. The device 102 yet further includes a flash mechanism 417 usable by the push notification mechanism 202 to generate a visible alert signal that serves as a push notification alert produced synchronously with the display of push notifications 307 on the touchscreen 303. In this example embodiment, the flash mechanism 417 includes an LED device that additionally serves as a flashlight for a camera forming part of the user device 102. The visible push notification alert in this embodiment thus comprises a series of flashes produced by the LED device. In other embodiments, the flash mechanism 417 can employ the touchscreen 303 to produce a visible flash alert in addition to displaying a corresponding push notification 307.

In this example embodiment, the push notification mechanism 202 is configured to cause the production of a push notification alert in combination with display of a push notification 307 only when the device 102 is in the inactive mode (e.g., when a user is not currently interacting with in-app on the device 102, or when the device 102 is locked). Thus, a certain chat event may trigger display of a push notification 307 together with the generation of a push notification alert (e.g., a ping, flash, and/or buzz) if notification of the chat event is received from the application server 112 while the device 102 is in the inactive mode, while the same chat event (disregarding for the moment the operation of the alert limiting mechanism 204) may trigger only display of a push notification 307, without a corresponding alert, if notification of the chat event is received from the application server 112 while the device 102 is active but in an application different from the chat application 104. In other embodiments, the push notification mechanism 202 can be configured to produce push notification alerts not only when the device 102 is in the inactive mode or locked, but also when the device 102 is in an active mode but in an application other than the chat application 104.

Alert limiting functionality is in this example embodiment implemented by the alert limiting mechanism 204, which manages push notification alerts such that alerts are suppressed for at least some chat events. Note that the described embodiments pertain to push notification alerts for chat events in the chat application 104, but that other embodiments may provide for push notification alerts for other social media events in a social media application.

In some embodiments the alert limiting mechanism 204 is configured to limit the number of times the mobile device 102 generates a push notification alert for chat events within a predefined time period, referred to herein as the suppression period. The suppression period is triggered by a suppression trigger event, being a chat event that satisfies predefined conditions or criteria.

Figure 5A:
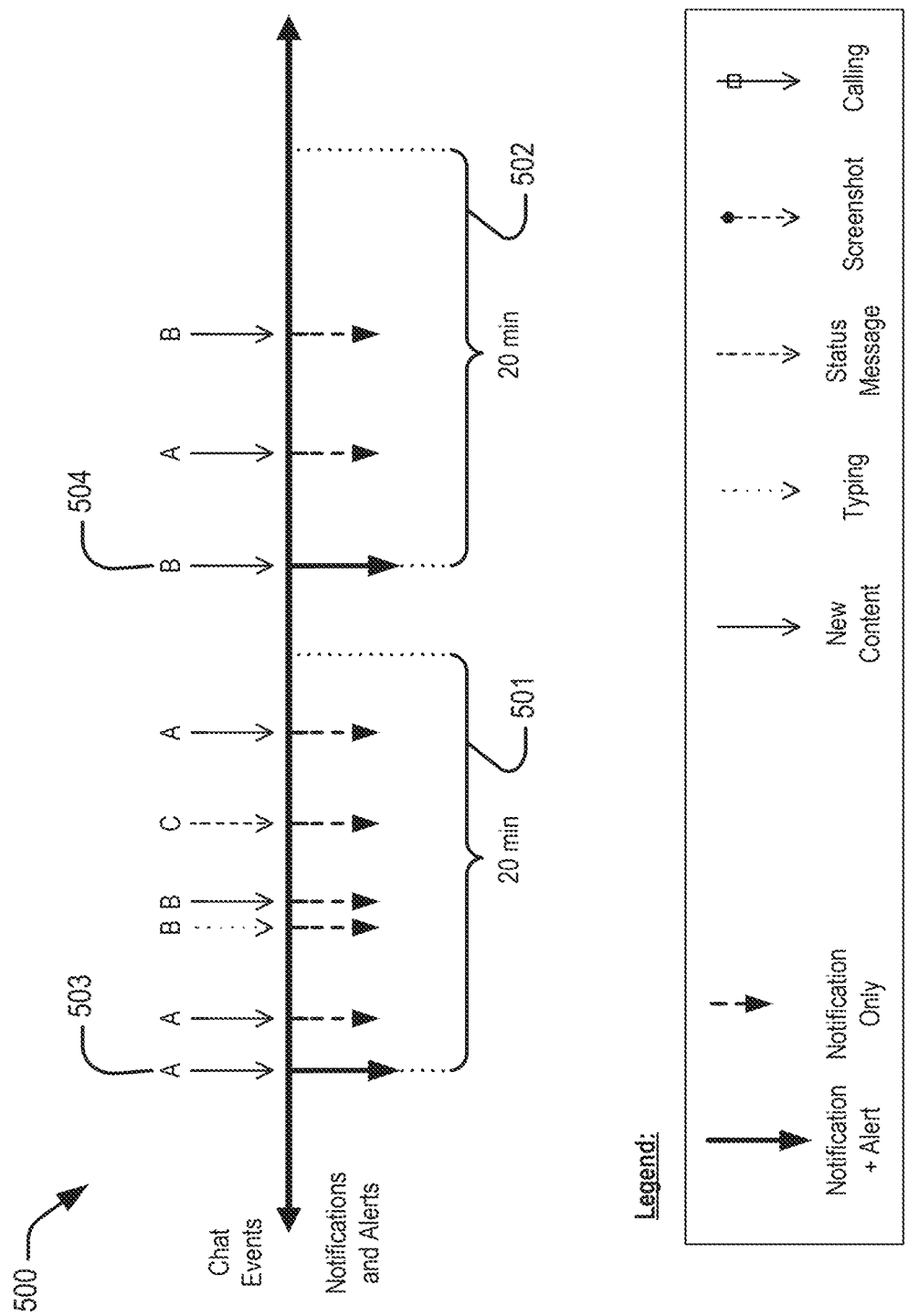
FIG. 5A-5D is a series of timeline diagrams illustrating operation of dynamic limiting of push notification alerts according to a number of different respective example embodiments.

In one example embodiment, a single suppression period is maintained at any particular time, suppressing alerts for all subsequent chat events for which notification is received within the suppression period. FIG. 5A shows a timeline diagram 500 illustrating an example embodiment of such a global or universal suppression period.

In the example embodiment of FIG. 5A, a typing event does not qualify as triggering a suppression period, while a new content event (e.g. a new chat message) does qualify as a suppression trigger event. In the timeline diagrams of FIG. 5 the timing of a chat event indicates the time at which notification of the occurrence of such an event is received at the mobile device 102. The legend in FIG. 5A clearly illustrate different symbols that represent different chat events and different responses by the push notification mechanism 202. In particular, it will be seen that a solid arrow below the line represents display of a push notification 307 together with associated generation of a push notification alert, in this particular example embodiment being an audible alert in the form of a ping. In contrast, a dotted-line arrow below the line represents the display of a push notification 307 (in this embodiment being a banner notification displayed on the touchscreen 303), without generating a corresponding synchronous push notification alert. The legend of FIG. 5A applies equally to FIGS. 5B-5D, without being repeated in each instance.

In the timeline diagram 500 of FIG. 5A, a new content event, at 503, indicates submission of a new non-text chat message from to the chat platform supported by the chat application 104. Message 503 is received while the user device 102 is in a locked mode, and automatically triggers the display of a push notification 307 and a push notification alert. Message 503 satisfied the relevant criteria for triggering a suppression period, and thus represents a suppression trigger event that starts a 20 minute suppression period 501. As illustrated in diagram 500, subsequent new content events, typing events, and status message events occurring within the suppression period 501 trigger the display of respective push notifications 307 only, the alert limiting mechanism 204 suppressing the generation of push notification alerts for the push notifications generated within the suppression period 501.

After expiry of the suppression period 501, a subsequent suppression trigger event (in this instance a new content event indicating submission of a new non-text chat message by user B, at 504) causes production of the first push notification alert subsequent to the initial suppression trigger event at 503, and triggers a new suppression period 502. In this manner, it will be seen that in the embodiment illustrated with reference to diagram 500, the user device 102 produces a push notification alert no more than once every 20 minutes. In some embodiments, a suppression period is automatically terminated by opening of the chat application 104 on the user device 102.

Figure 5B:
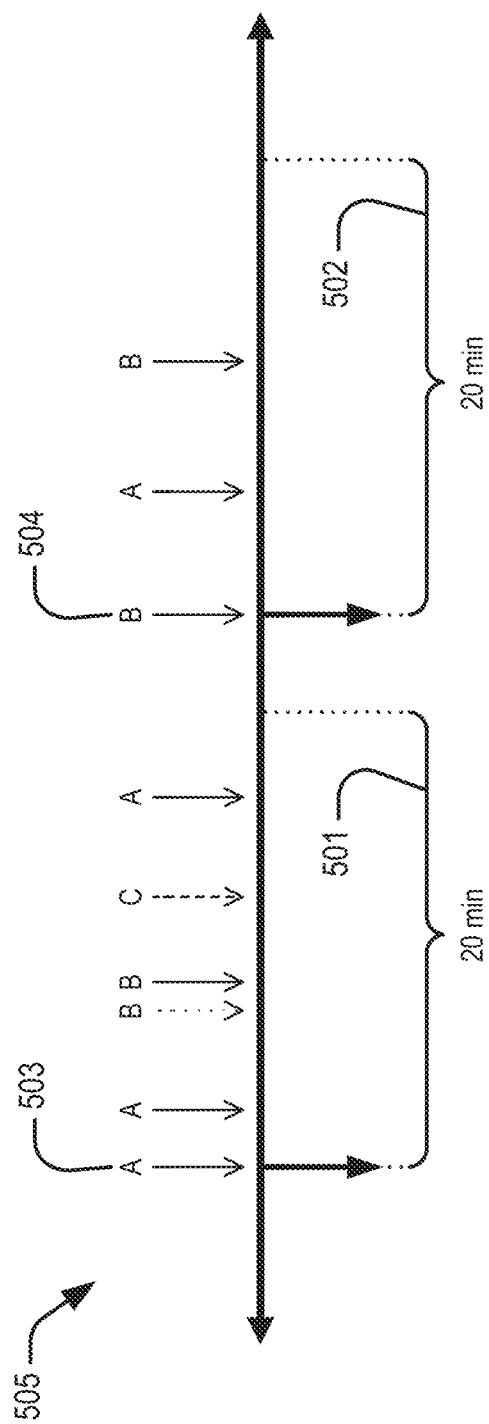

Again, note that some embodiments provide for rate limiting not only of push notification alerts, but for display of push notifications 307 themselves. FIG. 5B shows a timeline diagram 505 of such an embodiment for identical facts as those represented in FIG. 5A. It will be seen that, in the embodiment of FIG. 5B, no push notifications are generated in the suppression period. Note that the embodiments described further below with reference to FIGS. 5C-5D are described as being with respect to limiting of alerts only, but it is to be understood that (similar to the variants represented in FIG. 5A and FIG. 5B) the disclosure contemplates respective embodiments similar to that described in FIG. 5C-5D, in which rate limiting is applied to both push notifications and push notification alerts.

In some embodiments, separate suppression periods or timers can be triggered for different types of chat event types, for different respective chat groups, and/or for different respective users. Thus, for example more than one push notification alert may be produced within a given suppression period, with the different push notification is being produced for the different users, chat groups, and/or chat event types. In one example embodiment, for example, each one of a plurality of persons or chat groups has a corresponding 20 minute window within which a push notification 307 will produce a buzz are being no more than once.

Figure 5C:
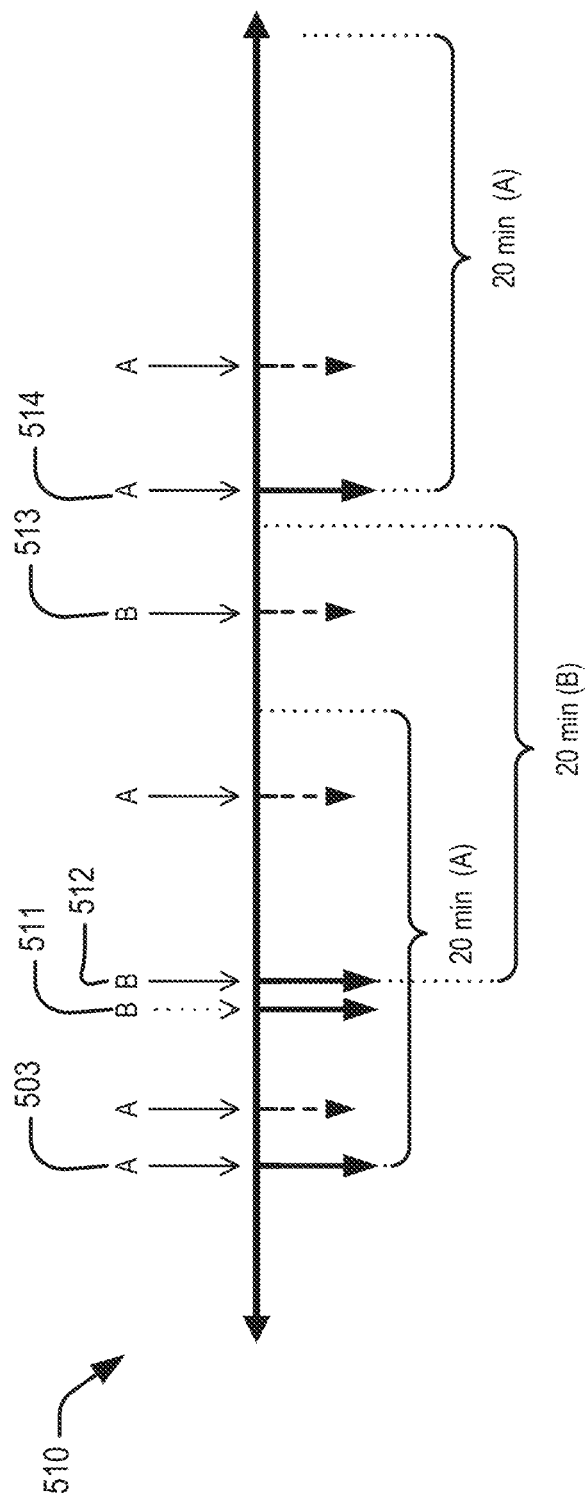
Figure 5D:
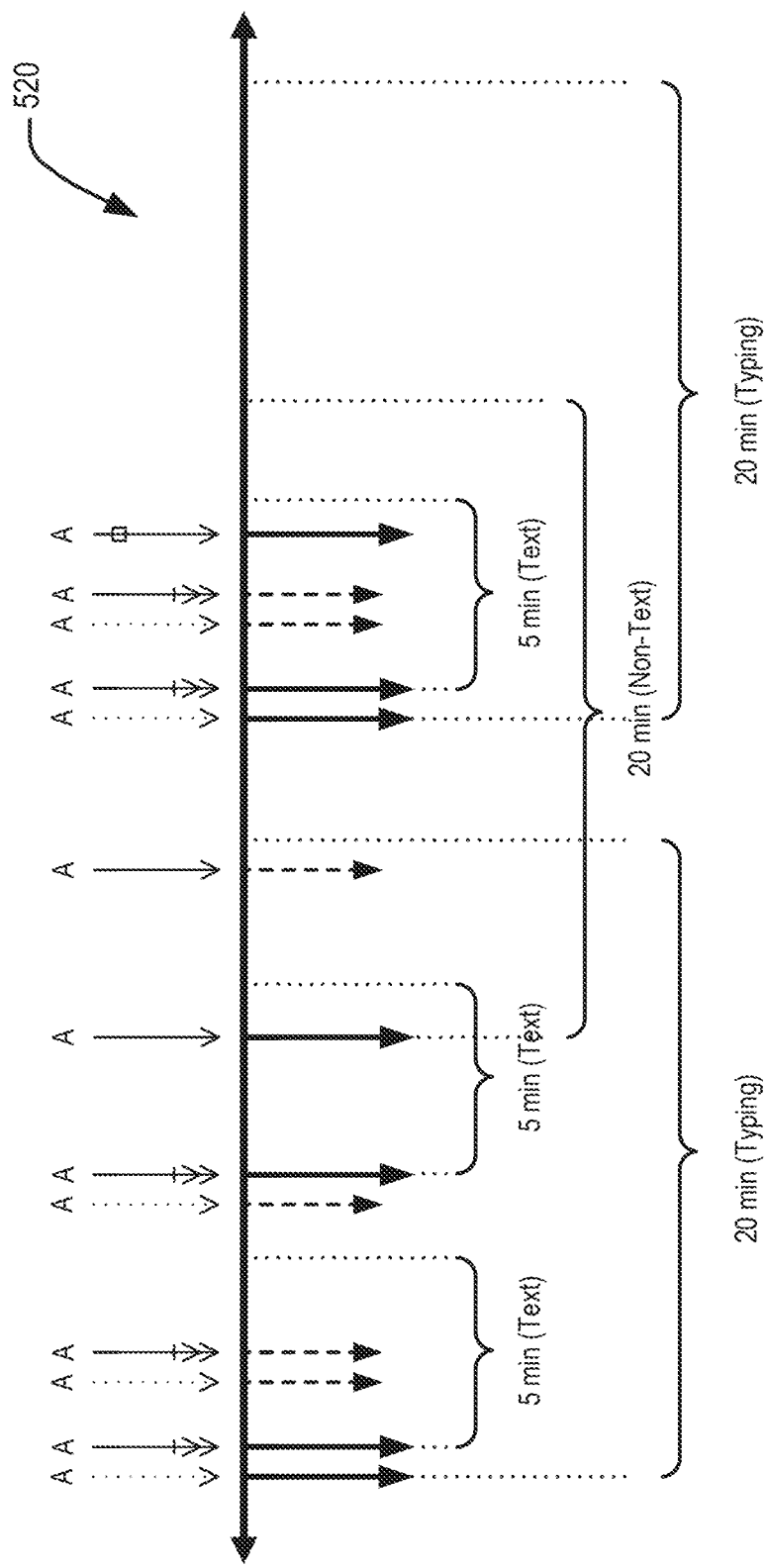

Timeline diagram 510 of FIG. 5C shows a simplified representation of an example embodiment in which different respective suppression periods are maintained for a plurality of different users. For clarity of illustration, chat activity for only two persons (designated user A and user B) is illustrated, but it will be appreciated that analogous individualized alert rate limiting can be performed for any number of users. It will also be appreciated that diagram 510 can equally be applied to different respective chat groups (e.g., chat group A and chat group B), each chat group consisting of a formalized set of users subscribed to or able to contribute to a separate common group thread or feed.

Turning now to the diagram 510 of FIG. 5C, it will be seen that an initial suppression trigger event for user A is provided by a new message event, at operation 503. This triggers suppression period 516 specific to user A. Subsequent chat events originating from user A within suppression period 516 do not trigger a corresponding push notification alerts.

Chat events originating from a different user, here user B, within the suppression period 516 for user A can, however, trigger push notification alerts. At 511, a typing event is received for user B, indicating that user B and started typing a text message. The typing event 511 triggers a corresponding push notification 307 and associated push notification alert. In this example embodiment, however, typing events do not satisfy the predefined conditions for suppression trigger events, and no suppression period is therefore triggered by the typing event 511. When user B thereafter, however, submits the text message, at 512, that new content event triggers a personal suppression period 517 for user B. Subsequent chat events originating from user B within the suppression period 517 are alert suppressed, as is the case, for example, with new content event 513.

After expiry of any one of the personalized suppression periods (e.g., 516, 517) a subsequent chat event that satisfies suppression trigger conditions and start a new timer or suppression period, as is, for example, the case with suppression period 518 triggered by the new content push at 514.

In some embodiments, a relevant suppression period is automatically reset when the chat application 104 is opened. The first subsequent chat event will thus be accompanied by a push notification alert, and will again initiate the push notification suppression period so that subsequent chat events of the particular group, user, and/or type are suppressed for the predefined suppression period. In instances where different suppression periods are maintained for different persons, groups, or event types, such opening of the chat application 104 can serve to reset only a particular one or some of the suppression periods. Considering, for example, timeline 510 of FIG. 5C, it will be understood that if the user opens the chat application by selecting the chat application 104 by interaction with the push notification produced with respect to user B at 512, the suppression period 517 is terminated, while the suppression period 506 with respect to user A remains in force.

Instead of, or in addition to, providing separate suppression periods for different persons or chat groups, different suppression periods may be implemented for different types of push notifications or chat events. In one example embodiment, push notification alerts for text messages are suppressed more aggressively than push notification alerts for chat events comprising media content, such as photos, videos, or ephemeral messages. In one example embodiment, text messages are suppressed at intervals of 20 minutes, while non-text messages (e.g., messages with media content) are suppressed at periods of five minutes. In some example embodiments, no suppression time limit applies for chat events that comprise media content such as photos, videos, or ephemeral content. Such ephemeral content may include Snaps or Stories such as those provided Snapchat.

In FIG. 5D, timeline diagram 520 illustrates a simplified example embodiment in which a 20 minute suppression period applies for typing events, a 5 minute suppression period applies for text message-, status-, and screenshot events, a 20 minute suppression period applies for nontext message events (including snaps, video clips, audio clips, and Stories submissions), and no suppression period applies for calling events. Note that the example embodiment of FIG. 5D is described with reference to the actions of a single user (i.e., user A). In some embodiments, rate limiting discrimination by chat event type such as that shown in FIG. 5D is agnostic to the particular user, so that the respective suppression periods in line diagram 520 apply equally to chat events originating from all users. In other embodiments, the separate limiting of alerts based on chat event type is combined with individualized rate limiting, such as that described with reference to FIG. 5C, so that a procedure such as that of FIG. 5D is applied to each of multiple users. In further embodiments, rate limiting for some chat event types may be universal, while rate limiting for other chat event types may be personalized.

In a particular example embodiment, type-specific alert limiting is applied per person, except for typing events, which are applied universally. In such case, a typing push alert can be received no more frequently than once every 20 minutes (in a case where the default suppression period for typing alert limitation is 20 minutes). In a further embodiment, typing alerts are subject to special rules according to which a universal typing suppression period can be triggered by a typing event, a new content event, or a status message event from any person. In other words, the mobile device 102 can in such embodiments generate a typing push alert (or, in embodiments where push notifications are suppressed, a typing push notification) only if the device 102 has not received a typing event, a new content event, or a status message event from anyone in the chat in the last 20 minutes.

As mentioned before, rate limiting may in some instances be provided with respect not only to push notification alerts, but to push notifications per se. A number of examples of such an implementation are briefly listed below, being implemented when the chat application 104 is closed or not currently active on the mobile device 102:

(a) if user A sends a text to a chat and then screenshots the chat, the user would receive a typing push followed by a new content push.

(b) If user A screenshots the chat with the content of the user associated with the mobile device 102 on-screen, the user would receive a screenshot push.

a. If user A immediately screenshots the chat again, the user would not receive another screenshot push.

b. If the chat application 104 is not opened and user A screenshots the chat again after an hour, the user would receive another screenshot push.

(c) If user A sends a text chat followed by user B sending five snaps (e.g., ephemeral video messages), the user would receive three pushes: a typing push and a new content push from user A, as well as a new content push from user B.

Figure 6:
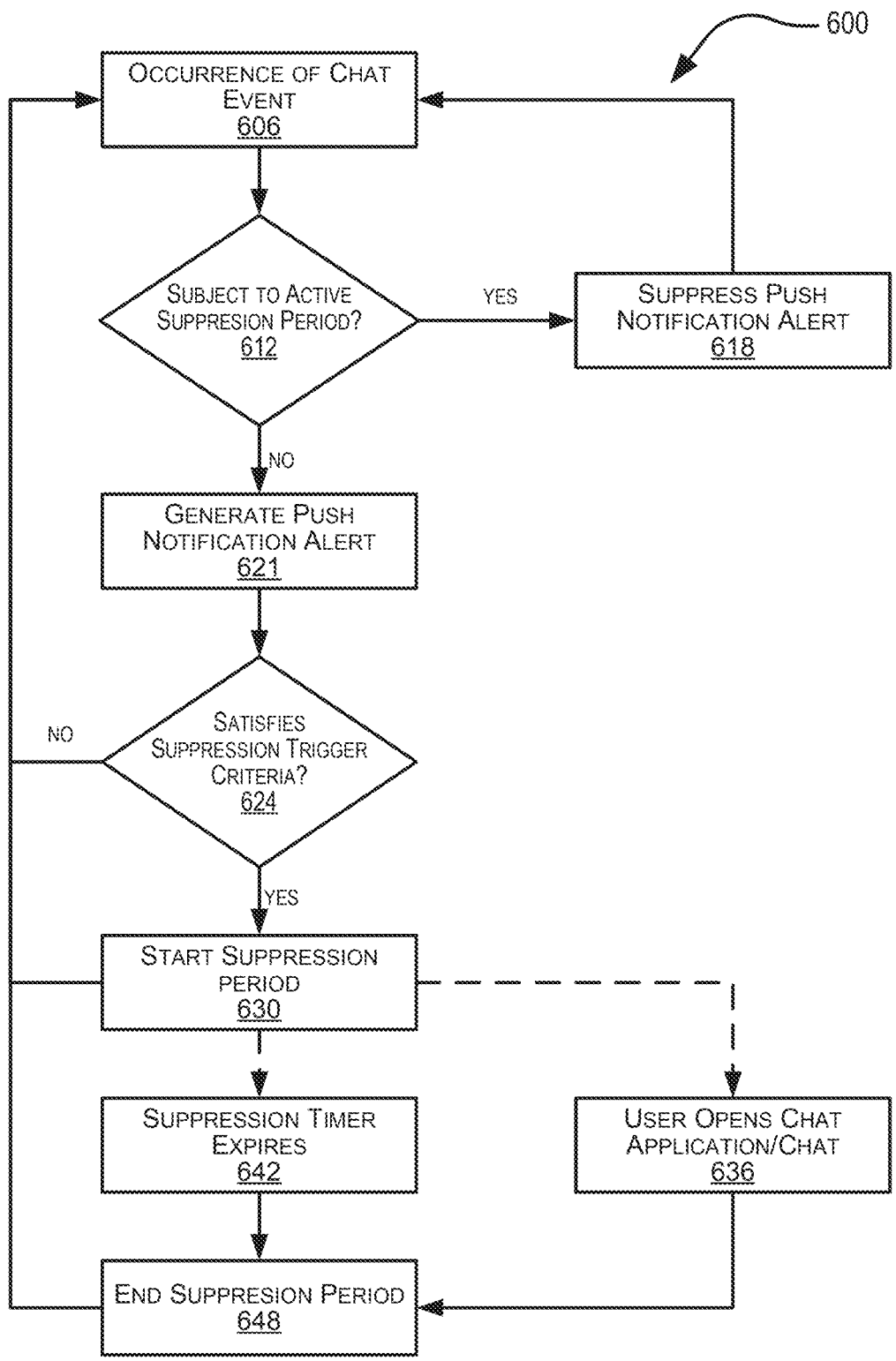
FIG. 6 is a schematic flowchart illustrating a method of managing push notification alerts, according to an example embodiment.

FIG. 6 shows a flowchart illustrating an example method 600 of rate limiting for push notification alerts according to an example embodiment. It will be appreciated that the method 600 is in this example embodiment implemented by the system components described previously with reference to FIGS. 1-4, implementing various ones of the functionalities described with reference to FIGS. 5A-5D.

At operation 606, notification of occurrence of a chat event is pushed to the mobile device 102. At operation 612, it is determined whether or not the newly received chat event is subject to an active suppression period. In other words, the alert limiting mechanism 204 determines whether or not the chat event satisfies the suppression criteria of a currently active suppression period.

It will be appreciated with reference to the example embodiments of FIGS. 5A-5D that the particular values and attributes of the suppression criteria can vary from one embodiment to another, will be different for different suppression periods in embodiments where more than one suppression periods can be maintained in parallel. It will thus be appreciated that the particulars of the relevant suppression criteria determine the alert limiting behavior within the suppression period. For instance, in the example embodiment of FIG. 5A, the suppression criteria for suppression period 501 can comprise merely: (a) that the timestamp of the new chat event is within 20 minutes of the suppression trigger event 503; and (b) that the chat event type is not a member of a set of event types that are exempt from the suppression period 501 (e.g., call events). In contrast, the example embodiment of FIG. 5C provides for suppression criteria that additionally determines whether or not the identity of the sender of the new chat event equals the identity of the sender of the relevant suppression trigger event pertaining to that suppression period.

Returning now to FIG. 6, it will be seen that if, at operation 612, it is determined that the new chat event satisfies the suppression criteria of an active suppression period, then the push notification alert for the new chat event is suppressed, at operation 618, in this example embodiment being prevented so as not to be produced. It is again noted that in some example embodiments, the limiting behavior at operation 618 pertains not only to prevention all suppression of audible and/or tactile push notification alerts, but applies also to display of a corresponding push notification 307 on the touchscreen 303. In such embodiments, the mobile device 102 performs no externally detectable push notification action or alert with respect to suppressed chat events.

If, however, is determined at operation 612, that the new chat event is not subject to an active suppression period, then a push notification 307 is displayed together with the generation of an associated push notification alert. As discussed earlier, the push notification alert may be one or more of an audible alert tone, a visible alert flash, or a tactile vibration burst or sequence. In some embodiments, generation of the push notification alert is additionally conditional on the current mode of the mobile device 102. Thus, in some embodiments, push notification alerts are generated only if the device is in an inactive mode in which the user is not currently interacting with any application via the touchscreen 303. In other example embodiments, push notification alerts are also generated for push notifications 307 are displayed while the user is interacting via the touchscreen 303 with an application other than the chat application 104.

At operation 624, the alert limiting mechanism 204 determines whether or not the new chat event satisfies predefined suppression trigger criteria. If so, a new suppression period is initiated by starting a corresponding suppression timer, at operation 630. If not, no corresponding suppression period is initiated. Again, the particulars of the suppression trigger criteria can differ from one embodiment to another. For example, in the embodiment of FIG. 5D, a typing event can trigger a 20 minute suppression period pertaining specifically to subsequent typing events. In contrast, the suppression trigger criteria of the example embodiment of FIG. 5C excludes typing events from serving as suppression triggers.

Note also that, as discussed previously, different default suppression timer values can apply for different event types, for different persons, and/or for different chat groups. In some embodiments, the disclosure provides for presentation of a customization user interface allowing a user to customize the default suppression timer values that applies to different event types, to different persons, and/or to different chat groups.

If, at operation 642, the relevant suppression timer expires, the suppression period is terminated, at operation 648. In some embodiments, however, a suppression period can be ended by an intervening user action occurring before expiry of the corresponding suppression timer. In one embodiment, opening of the chat application 104 by the user, at operation 636, prior to expiry of the suppression timer automatically causes the relevant suppression period to end. In some embodiments, any opening of the chat application 104 and all active suppression periods. In other embodiments, only some active suppression periods may be terminated by opening a particular chat or message. In one example embodiment, opening of a particular chat group or a particular chat message causes termination only of suppression time as pertaining to that chat group or to the sender of the opened chat message. Instead, or in addition, the particular suppression periods that are terminated are determined by the particular push notification 307 selected by the user to open the chat application 104.

In some embodiments, a customization user interface may be provided to permit the user associated with the mobile device 102 to selectively change rate limiting behavior for different persons, different chat event types, different chat groups, or the like. Thus, for example, a user can selectively whitelist certain persons or groups so that no push notification and/or alert suppression occurs for those entities. Instead, or in addition, the rate limiting period can be selectively changed for each such entity.

In some embodiments, differentiating rate limiting behavior for different persons or groups may be implemented automatically. For example, alert limiting mechanism 204 can in some embodiments be configured automatically to identify a user's closest or best friends based on historical behavior in the chat application 104, and automatically to reduce the suppression period for such friends. In some embodiments, persons identified as "best friends" may be exempt from push notification alert suppression.

In some example embodiments, the alert limiting mechanism 204 is configured automatically to identify relative geographical locations of respective user devices 102 associated with different persons partaking in a chat session, and automatically to modify push notification alert suppression behavior based on the determined relative location. Thus, for example, the method and/or system may be configured automatically to identify that respective user devices associated with particular users partaking in a chat session are geographically within a predefined range, and to modify or eliminate notification alerts for such geographically proximate users.

Push Notification Batching

Another aspect of the disclosure provides push notification batching in this example embodiment being implemented by the push notification batching mechanism 206. It will be appreciated that existing chat applications often generate a separate push notification 307 for each chat event. As is the case in the example push notification 307 of FIG. 3, such push notifications typically comprise a user interface element in the form of a push notification banner automatically displayed out-of-application or on a lock screen of the user device 102, when the device 102 is in the inactive mode.

In contrast, the push notification batching mechanism 206 is configured to coalesce or batch multiple push notifications into a common user interface element, for example in a common batch notification banner. One example of such a batch notification banner is indicated by a reference 707 in screenshot 754 of FIG. 7B. For clarity of description, such user interface elements providing batched push notifications will further be referred to as batch notification banners, but it is to be appreciated that other embodiments of the disclosure may provide for batched push notifications in user interface elements other than the exemplified batch notification banner 707.

In some embodiments, all chat events occurring within the chat application may be coalesced into a single batch notification banner. Instead, a plurality of different batch notification banners may be provided for chat events of different types, of different chat groups, of different persons, or the like. For instance, in the example screenshot 761 of FIG. 7F multiple chat events are coalesced into 3 separate batch notification banners relating to different respective chat event types. In particular, batch notification banner 707 indicates a plurality of new content events with respect to a particular chat group, batch notification banner 714 indicates a number of screenshot events pertaining to the capturing of a screenshot with respect to content provided by the viewing user to a particular chat group, and batch notification banner 721 indicates screenshot events pertaining to capturing of a screenshot with respect to a chat board of a particular chat group.

Thus, in some example embodiments, separate batch banners are provided for text messages, for media content messages, for name changes, for screenshot alerts, and/or for the addition of friends to the group. It will be appreciated that the mentioned criteria for batching together different push notifications are non-exhaustive, and that other criteria may be employed in other embodiments. Furthermore, notification batching can in some embodiments be performed on a combination of two or more different attributes. In one example embodiment, push notifications are batched in different notification banners based on a combination of chat group and chat event type. Thus, for example, multiple chat events consisting of screenshots and new chat messages for two different respective chat groups really in such an embodiment being coalesced into four different batch notification banners, namely a new content banner and screenshot banner for each of the two groups.

Figure 7A:
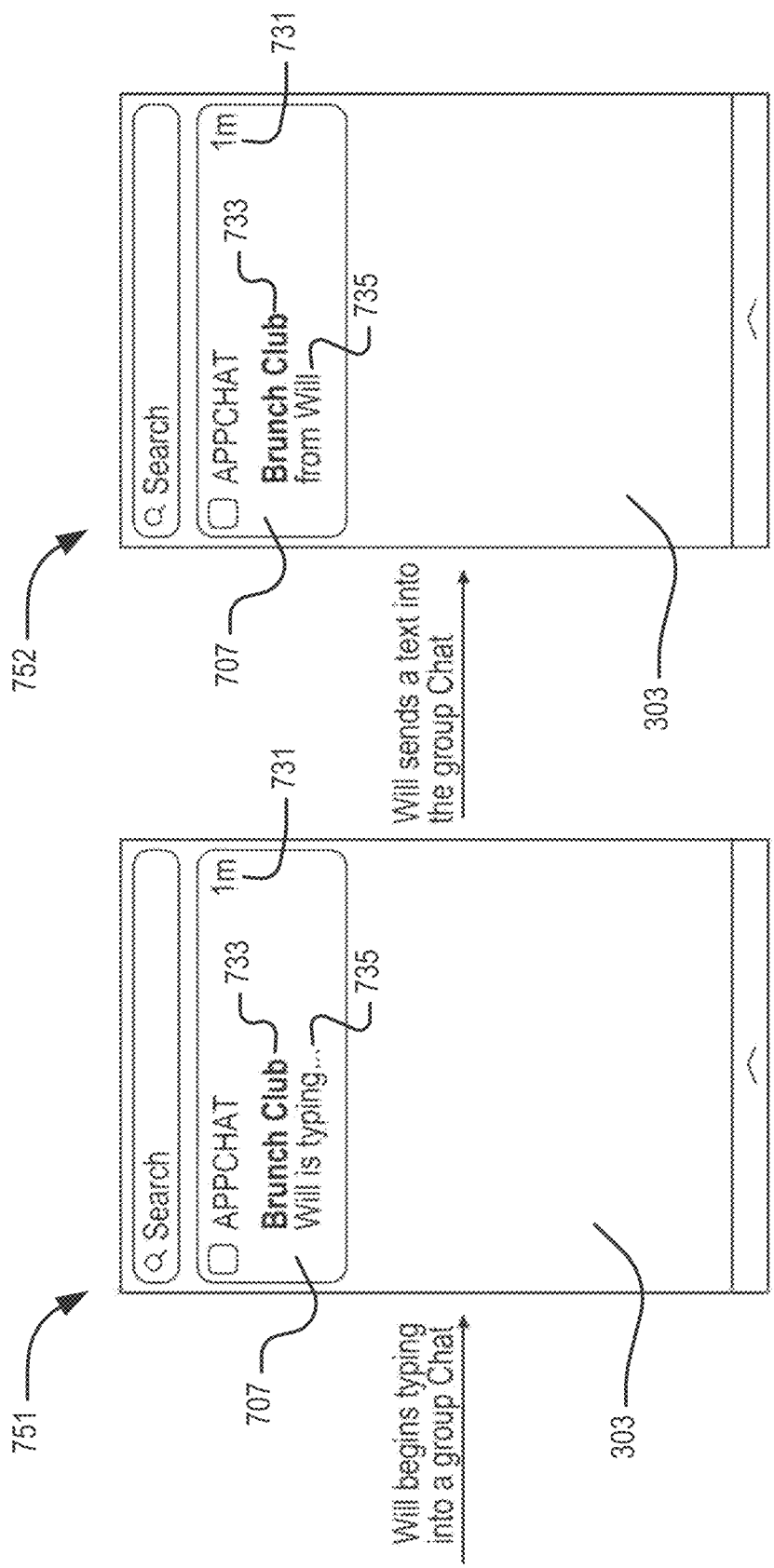
FIG. 7A-7F is a sequence of screenshots illustrating a method of batching push notifications, according to an example embodiment.

In some embodiments, the batch push notification may comprise a user interface element that includes a timestamp indicating the time of receiving a latest chat event forming part of the batched banner. Example of such a timestamp is indicated in FIG. 7A by reference numeral 731. Such a timestamp 731 is continually updated automatically with the addition of new chat events included in the associated batch notification banner 707.

In some embodiments, each batch notification banner may include indicia indicating relevant chat events included within the banner. An example embodiment of such indicia is indicated by reference number 735 in FIG. 7A, comprising event text 735 indicating the chat event(s) to which the banner 707 pertains. In some example embodiments, the indicia (e.g., the event text 735) includes identification of persons for whose actions notifications are included in the coalesced batch banner.

In some embodiments, the batch notification banner includes a context indicator that provides context for the associated push notifications, additional to the information provided by the event text 735. An example embodiment of FIG. 7A, the batch notification banner 707 includes a context indicator 733 that indicates the name or title of a particular chat group to which the batch notification banner 707 pertains. It will be appreciated that, in other embodiments, such a context indicator can provide context information differ from or additional to chat group. In an example embodiment, the context indicator 733 can indicate the particular person to whom the associated push notifications related, with the notifications being batched according to event type.

FIGS. 7A-7F show a sequence of screenshots 751-761 for push notification batching comprising display of batch notification banners on a lock screen of the example mobile device 102 in accordance with one example embodiment. In this example embodiment, the push notification batching is implemented by the notification batching mechanism 206 described earlier. Note that the respective screenshots 751-761 represent a sequence of batch notifications responsive to the respective chat events indicated in the respective drawings. For clarity of illustration, a timestamp 731, a context indicator 733, and event text 735 are indicated by respective reference numerals in FIG. 7A only. Evolution and changes of the content of these elements in the progression of the series of screenshots 751-761, however, are to be noted.

Note that the push notification batching implemented according to the example embodiments of FIGS. 7A-7F are in this embodiment combined with the previously described push notification alert management. It will just be understood that for each described the chat event a corresponding push notification alert will be produced or suppressed, according to the example method 600 of FIG. 6. In some embodiments, no such alert limiting or suppression is applied.

First, screenshot 751 in FIG. 7A shows a push notification banner 707 communicating a new typing push, indicating that a certain person is typing a chat message. Once typing is completed and the associated new chat message is received, the event text 735 of the push notification banner 707 is updated (screenshot 752) to reflect the name of the individual from which new message has been received. The context indicator 733 communicates the particular chat group to which the new chat message was submitted. The timestamp 731 indicates a time elapsed since receiving the new chat message. Note that these two notifications do not, in FIG. 7A, provide two separate notifications, but that the respective push notifications are batched in screenshot 752 in a single batch notification banner 707.

In screenshot 753 (FIG. 7B), another individual sends a text message to the same chat group. A responsive push notification for new content uploaded to the chat group is batched in the new content banner 707. Note that the push notification can in some embodiments be accompanied by a corresponding push notification alert. Instead, however, of displaying a separate banner for the new text message, information for the new text message is included in the common push notification banner 707. The event text 735 is updated in screenshot 753 to indicate the users for which respective new content pushes are included in the umbrella push notification banner 707.

Figure 7B:
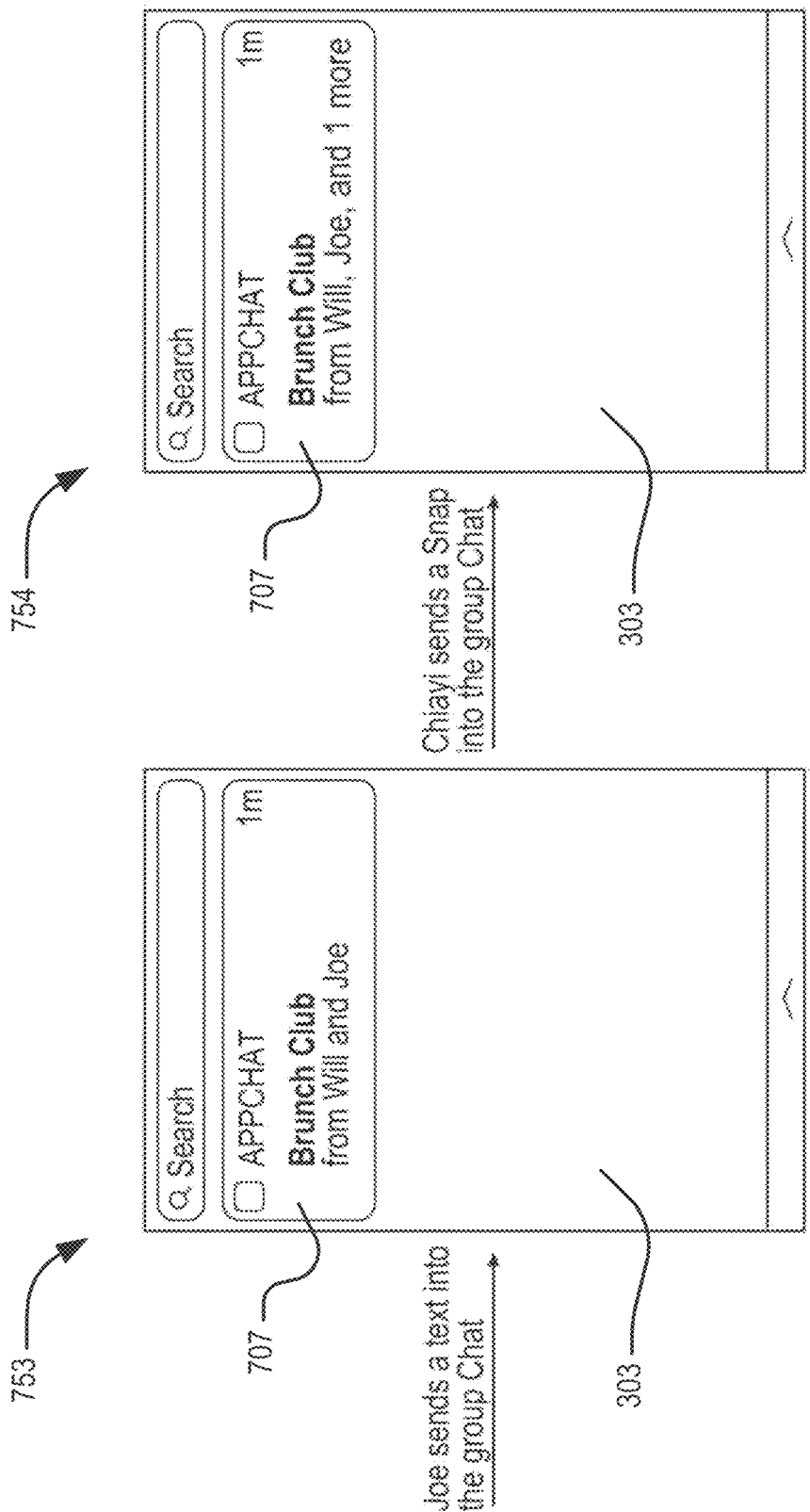

When, in screenshot 754 of in FIG. 7B, another new message is received from yet a further individual, the corresponding new push notification is again included in the single common push notification banner 707. Note that the event text 735 is in this example embodiment updated to include the name of the new contributing user, but (in this case due to space constraints) a numerical indication of the number of users for whom new content push notifications are included in the banner 707 is indicated in the event text 735. Note also that, in this example embodiment, both text and multimedia messages (e.g., video clips, pictures, or snaps) are coalesced into a single common banner 707. In other embodiments, different types of messages may be batched in different respective banners.

Figure 7C:
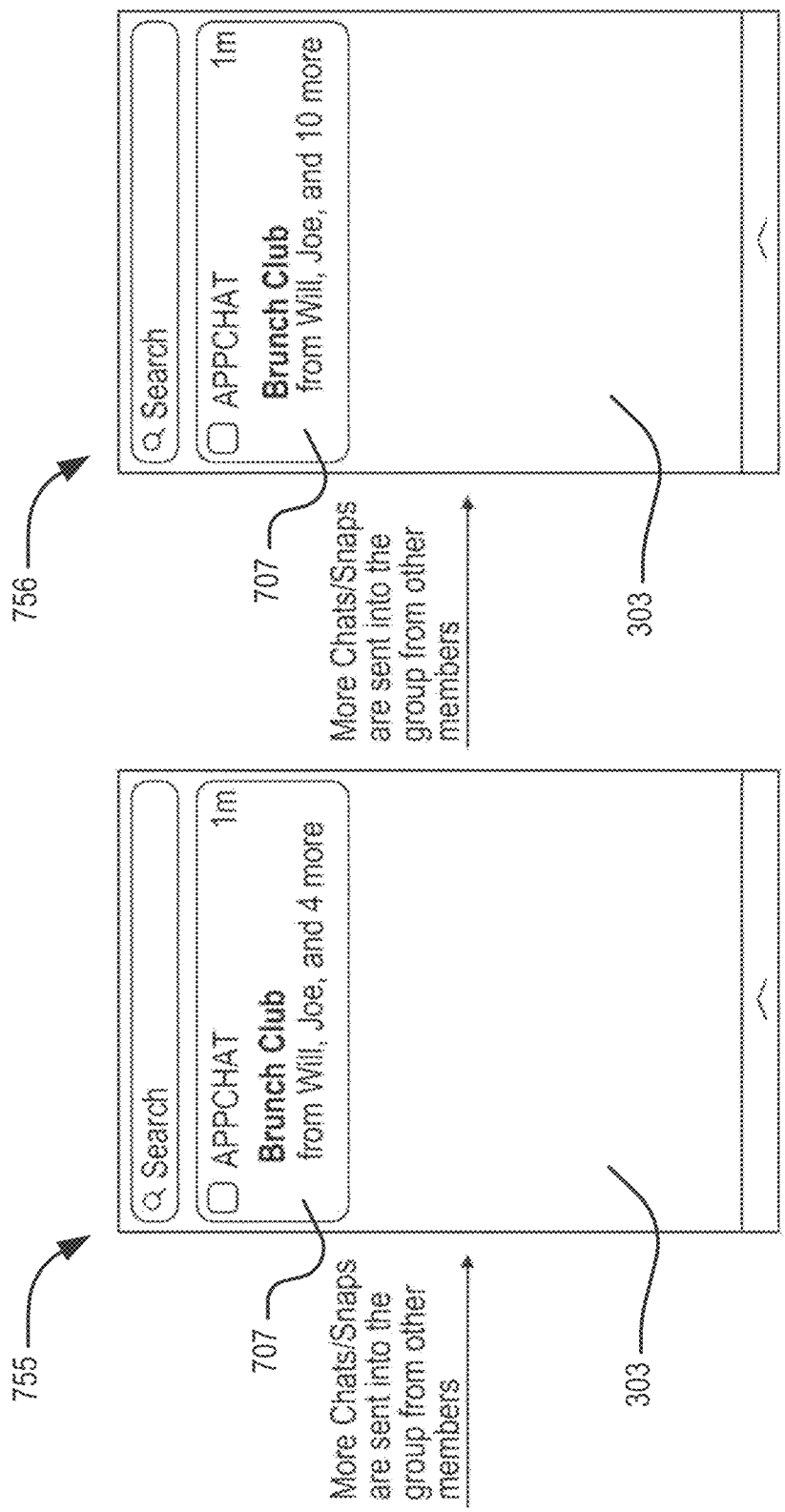
Figure 7D:
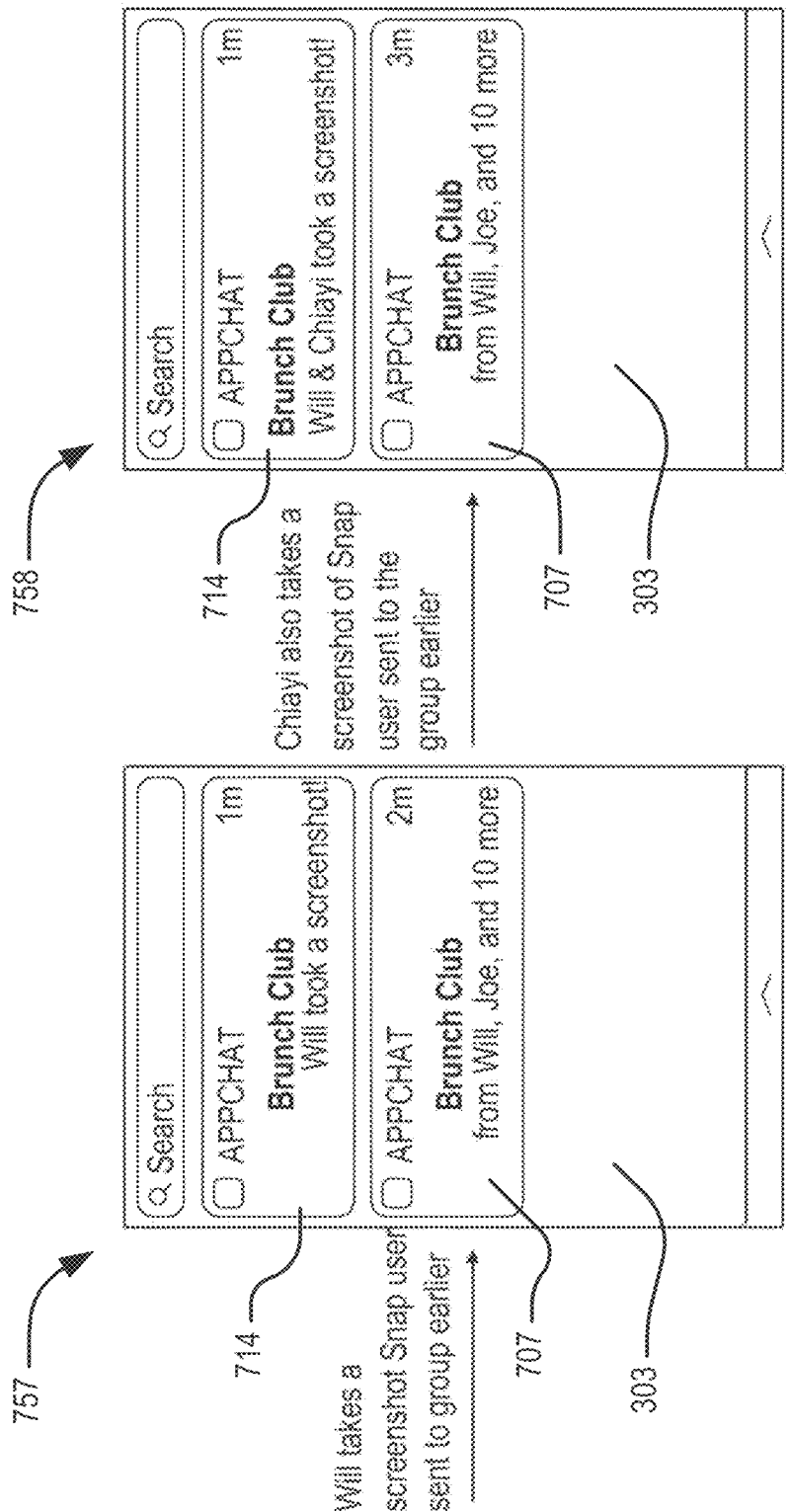

The provision of multimedia content in the form of snaps in FIG. 7C for the particular chat group are likewise coalesced into the single batch notification banner 707 in screenshots 755 and 756 of FIG. 7C. In each instance, the event text is updated to indicate the number of contributing users included in the batch notification banner 707, and the timestamp 731 is updated to indicate time elapsed since the most recently received message that is included in the banner 707.

In this embodiment, however, the push notification batching mechanism 206 is configured to provide separate batch notifications for screenshots. Responsive to receiving, at screenshot 757 of FIG. 7D, indication of a screenshot taken by another user of content provided by the user associated with the mobile device 102, a new batch notification banner 714 is displayed with respect to content screenshots. At screenshot 758, another person takes a screenshot of content uploaded by the viewing user, and the screenshot banner 714 is consequently updated to include in its event text 735 an indication of the identities of those users to whom respective screenshot push notifications pertain. Note also that the most recently updated one of the plurality of push notification banners 707, 714 (in screenshot 758 being the screenshot banner 714) is displayed most prominently, being located at the top of a vertically extending series of push notification banners 714, 707. Any further screenshots from that person or other persons are coalesced in the single notification banner 714 for screenshots.

Figure 7E:
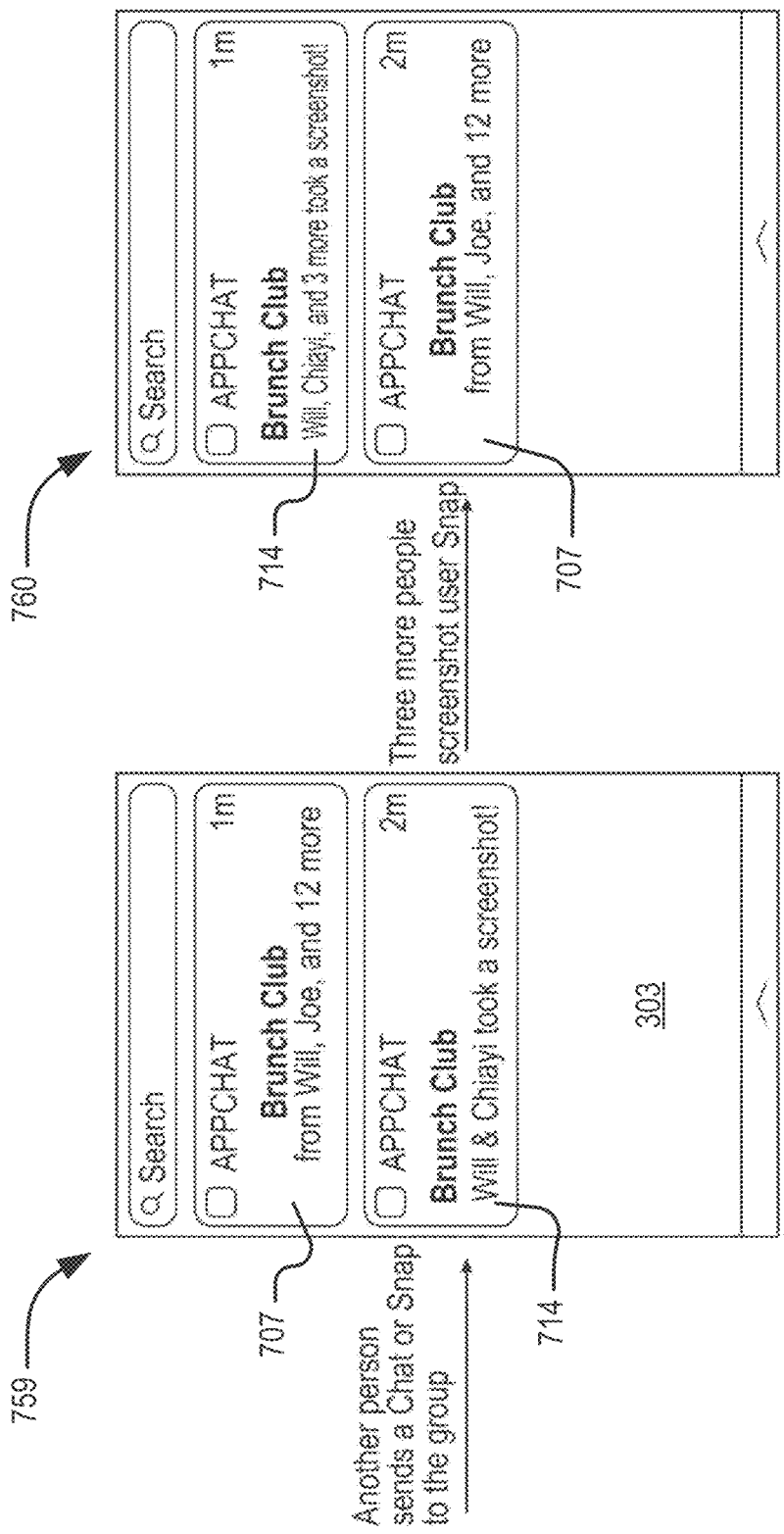

In the screenshots 759, 760 of FIG. 7E, operation of notification batching mechanism 206 to display the most recently updated push notification banner in top position is illustrated. When a new content push is received, at screenshot 759, the event text 735 of the new content manner 707 is updated and moved to top position. Thereafter, when, at screenshot 760, more content screenshot pushes are received, the content screenshot banner 714 is updated in similar fashion and moved to top position.

Figure 7F:
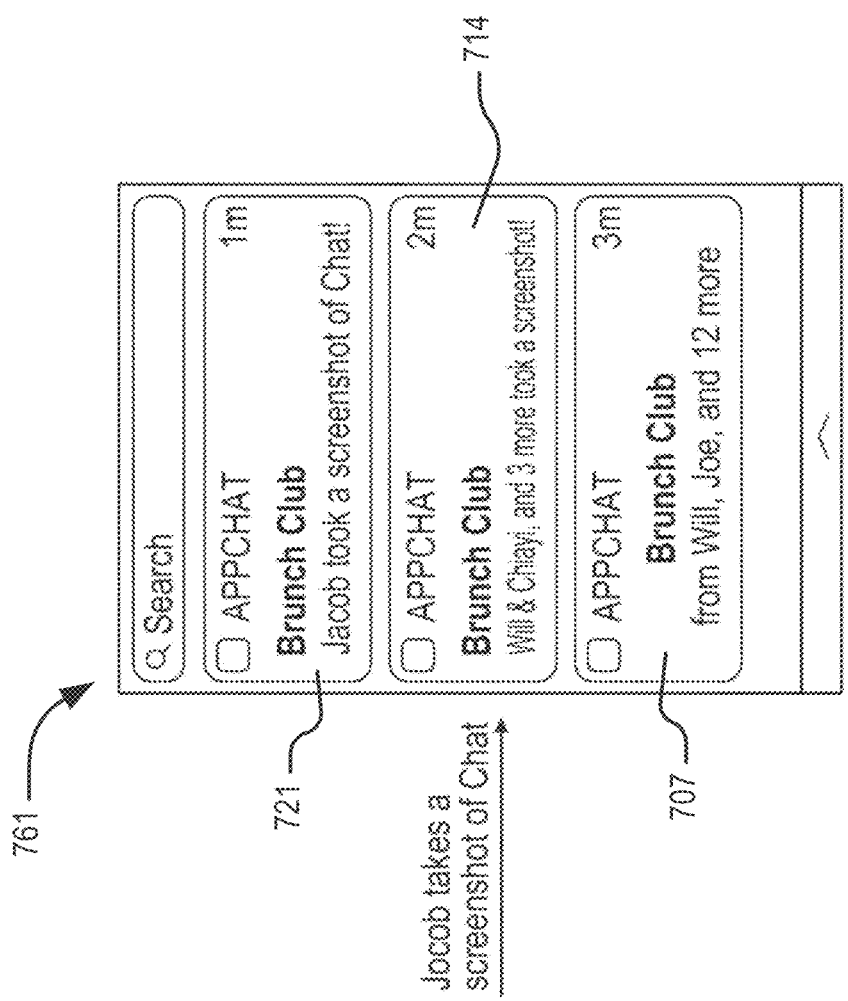

Screenshot 761 of FIG. 7F illustrates display of yet a further push notification banner 721 with respect to a different types of chat event. In this example embodiment, a separate batch banner 721 is provided for screenshots taken of the relevant chat board or chat thread. Thus, in the example of FIG. 7F, three separate push notification banners 707, 714, 721 are displayed with respect to different respective types of chat events, with the vertical sequence of the banners again being determined by recency of associated activity.

Figure 8:
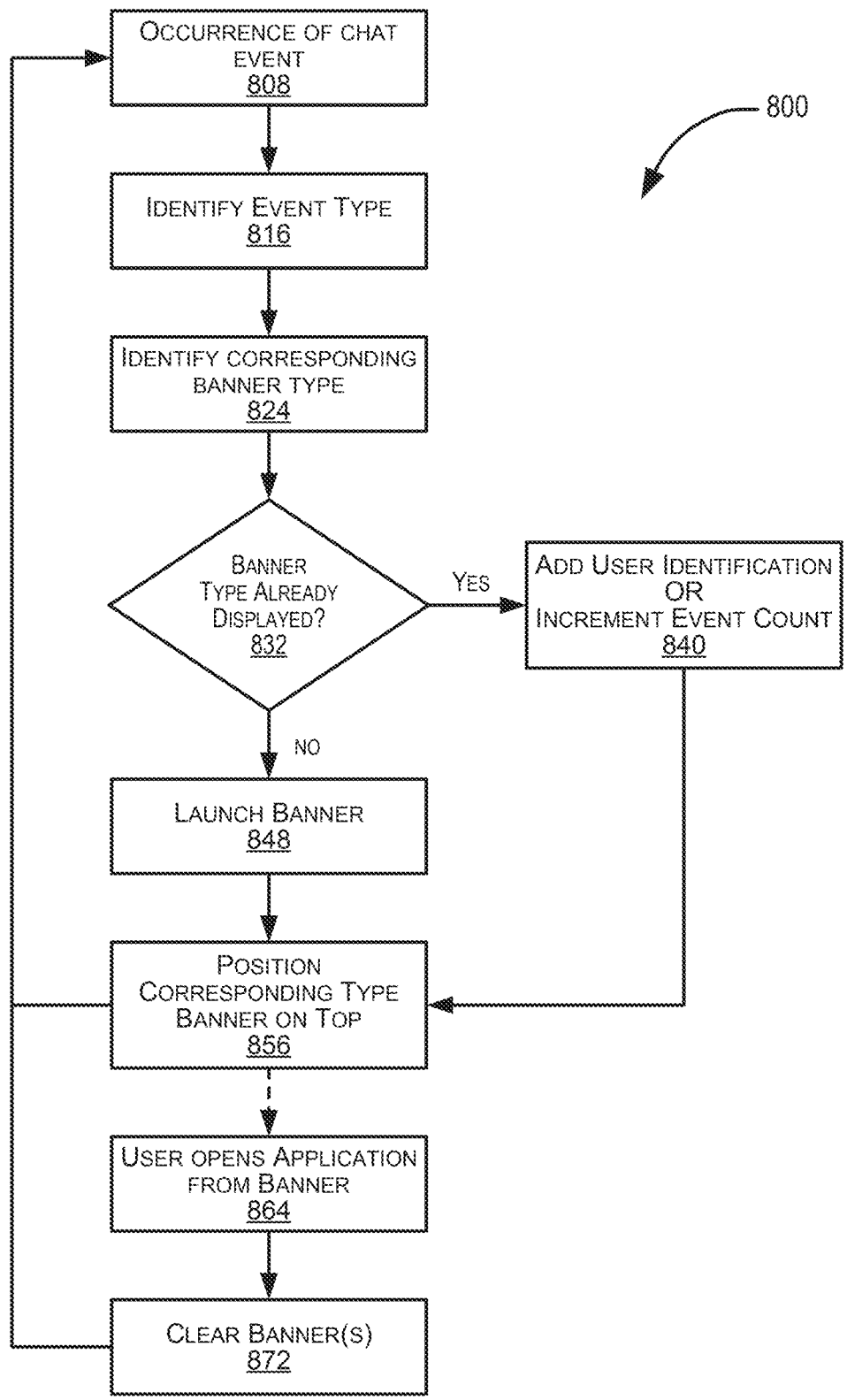
FIG. 8 is a schematic flowchart illustrating a method of batching push notifications, according to an example embodiment.

FIG. 8 shows a flowchart illustrating an example method 800 of implementing push notification batching according to the example embodiment, the method being implemented by the notification batching mechanism 206 of the example embodiments described with reference to FIGS. 1-4 to implement push notification batching consistent with the example embodiments of FIGS. 7A-7F.

At operation 808, notification of the occurrence of new chat event is received. At operation 816, the relevant event type is identified. Thus, for example, the new chat event is identified as being a new content event, a screenshot event, a status update event, or the like.

At operation 824, a particular batch banner type for the identified chat event type is identified. Thus, for example, it is determined in which one of a predefined plurality of different batch notifications the new chat event is to be included. At operation 832, it is determined whether or not the identified banner or notification type is currently displayed or is active.

If a batch notification banner of the identified type is already displayed, then the new chat event is included in the existing push notification banner. In this example embodiment such inclusion comprises updating the event text 735 or incrementing an event count that may be included in the batch notification. The timestamp 731 is also updated, and the newly updated batch notification banner is positioned in a topmost location, at operation 856.

If, however, at operation 832, it is determined that the identified banner type is not currently displayed, a new batch notification banner is launched, at operation 848, with event text 735 indicating the new chat event. The newly launched banner is thereafter positioned topmost in the list of batch notification banners.

Different conditions may apply in different embodiments for clearing the displayed batch notification banner(s). In this example embodiment, batch push notification banners pertaining to a particular chat group is cleared, at operation 872, when the user opens the chat application 104 and views the relevant chat group, at operation 864. Where there are different banners for different chat groups, only the batch banners for the opened chat group is cleared in this example embodiment. In other embodiments, all batch notification banners for the chat application 104 may automatically be cleared when the chat application 104 is opened. In yet further embodiments, only a batch notification selected by the user to launch the chat application 104 is cleared.

It will be seen that it is a benefit of push notification batching, as described above, that it reduces clutter in a notification center of the mobile device 102, and that it reduces the proliferation of push notifications that can often occur in chat applications. In this manner, more effective use is made of available screen area of the device 102, and less computational resources are consumed by the generation and display of push notifications 307, thus improving functioning of the device 102 compared with existing device 102 that provide for push notifications in chat applications 104.

Machine and Software Architecture

These systems, system components, methods, applications and so forth described in conjunction with FIGS. 1-8 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines configured for particular purposes. For example, a particular hardware architecture coupled with a particular software architecture will create a mobile device, such as a mobile phone, tablet device, or so forth. A slightly different hardware and software architecture may yield a smart device for use in the "Internet of Things," while yet another combination produces a server computer for use within a cloud computing architecture. The software and hardware architectures presented here are example architectures for implementing the disclosure, are is not exhaustive as to possible architectures that can be employed for implementing the disclosure.

Software Architecture

Figure 9:
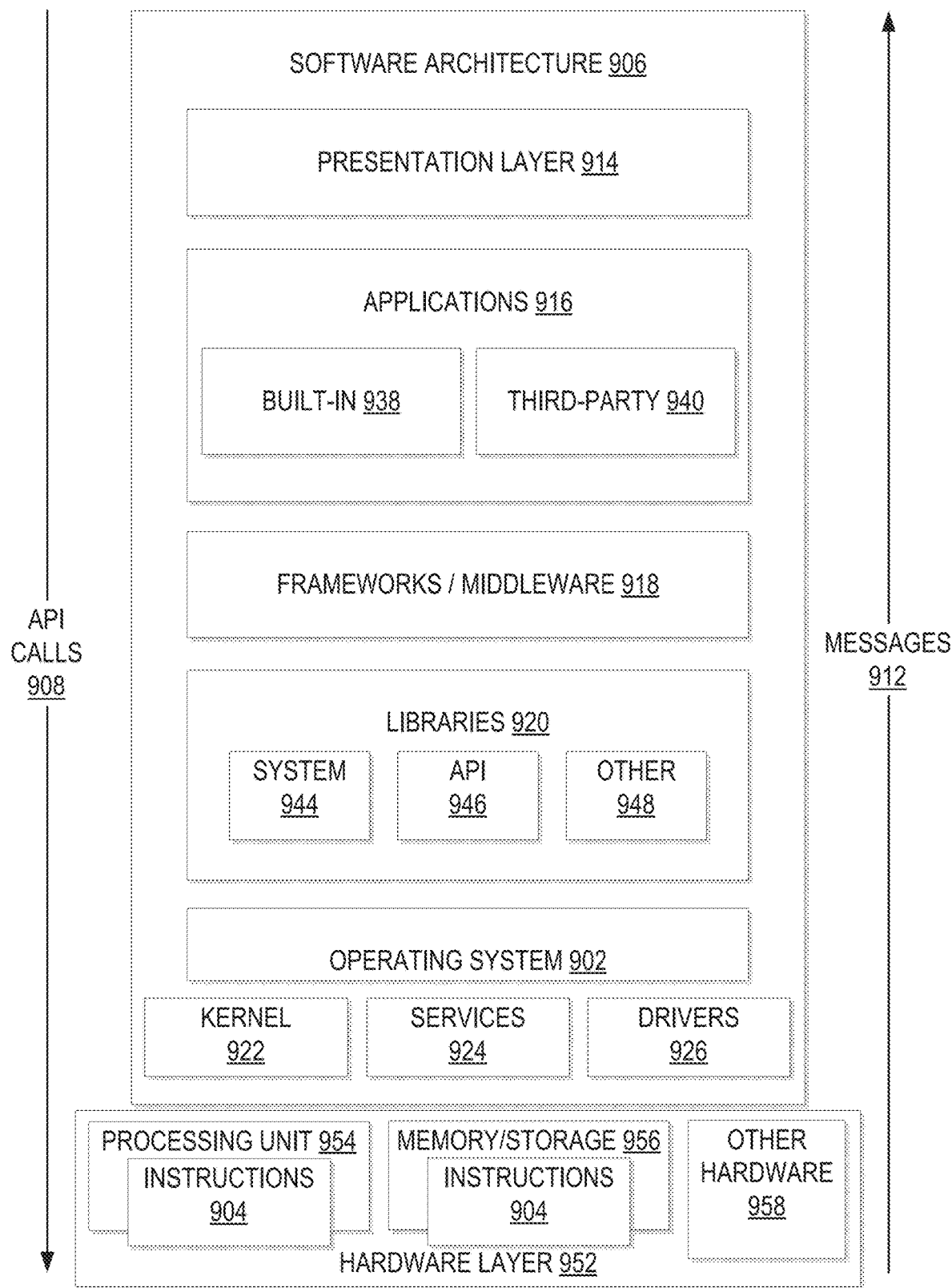
FIG. 9 is a block diagram illustrating an example of a software architecture that may be installed on a machine to provide for a specially configured system to manage push notifications and/or push notification alerts, according to some example embodiments.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as machine 1000 of FIG. 10 that includes, among other things, processors 1004, memory 1014, and input/output (I/O) components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components and so forth described herein. The hardware layer 952 also includes memory and/or storage modules 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, applications 916, frameworks/middleware 918 and a presentation layer 914. Operationally, the applications 916 and/or other components within the layers may invoke API calls 908 through the software stack and receive a response 912 to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic user interface (GUI) functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built in operating system functions (e.g., kernel 922, services 924, and/or drivers 926), libraries 920, and frameworks/middleware 918 to create user interfaces to interact with users of the system. Alternatively, or additionally, in some systems interactions with a user may occur through a presentation layer, such as presentation layer 914. In these systems, the application/component "logic" can be separated from the aspects of the application/component that interact with a user.

Hardware Architecture

Figure 10:
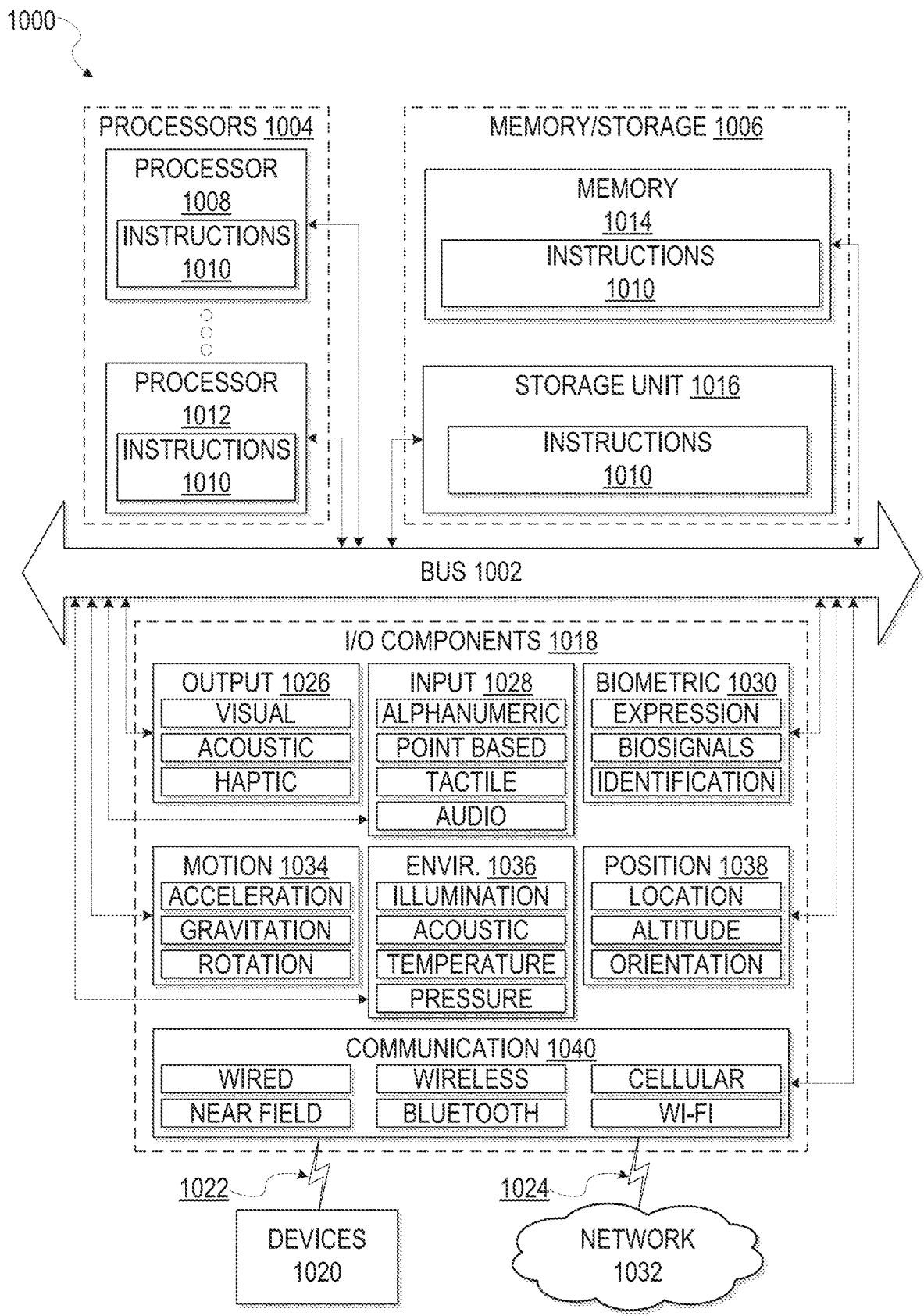
FIG. 10 is a diagrammatic representation of a machine in the example form of a computer system within which a set of instructions may be executed for causing the machine to perform any one or more of the methodologies discussed herein, according to an example embodiment. In some example embodiments, execution of the set of instructions by the machine may provide the machine with a push notification mechanism, an alert limiting mechanism, and/or a batching mechanism, as described herein with respect to different example embodiments.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004 (e.g., an array of processors 908-912, memory memory/storage 1006, and I/O components 1018, which may be configured to communicate with each other such as via a bus 1002. The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1030, motion components 1034, environmental environment components 1036, or position components 1038 among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environment components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via coupling 1022 and coupling 1024, respectively. For example, the communication components 1040 may include a network interface component or other suitable device to interface with the network 1032. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as, location via Internet Protocol (IP) geo-location, location via Wi-Fi® signal triangulation, location via detecting a NFC beacon signal that may indicate a particular location, and so forth.

GLOSSARY

"CARRIER SIGNAL" in this context refers to any intangible medium that is capable of storing, encoding, or carrying instructions for execution by the machine, and includes digital or analog communications signals or other intangible media to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistant (PDA), smart phone, tablet, ultra book, netbook, laptop, multi-processor system, microprocessor-based or programmable consumer electronics, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient.

Regardless of the setting technique, the message is transitory. "Snaps" as referenced in the description are ephemeral messages.

"MACHINE-READABLE MEDIUM" in this context refers to a component, device, or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.
Language Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated, unless that the context and/or logic clearly indicates otherwise. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the disclosed subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. The specification and drawings are, accordingly, to be regarded in an illustrative rather than a restrictive sense.

What is claimed, is:

1. A method comprising:
providing a push notification service with respect to an application that is hosted by a user device and that provides messaging functionality with a plurality of users via a messaging platform associated with said application, the push notification service being configured to automatically generate respective push notification alerts in response to receiving, while the user device is in an inactive mode, notification of predefined alert-triggering events, each push notification alert comprising an audible and/or a tactile indication generated by the user device; and
in an automated operation performed using one or more computer processor devices configured therefor, dynamically limiting push notification alerts based on predefined alert suppression criteria, such that respective push notification alerts are suppressed for at least some of the events, wherein the alert suppression criteria define a respective type-specific suppression period for each event type in a predefined set of message event types, such that the respective type-specific suppression period for two or more of the predefined set of event types differ in length,
wherein said two or more message event types with different respective suppression periods are selected from the group consisting of: text messages, non-text messages, typing events, status messages, screenshots, and calling events, and
wherein the limiting of push notification alerts comprises:
identifying a particular message event as a suppression trigger event for a particular one of the set of message event types; and
generating a push notification alert for the suppression trigger event; and responsive to identifying the suppression trigger event, performing type-specific alert suppression for a suppression interval that extends for respective predefined type-specific suppression period subsequent to the suppression trigger event, such that push notification alerts are universally suppressed for any message event that is of said particular type and that occurs during the suppression interval.

2. The method of claim 1, wherein a shorter type-specific suppression period applies to non-text messages in the form of media message events than text message events.

3. The method of claim 1, wherein no suppression period applies to calling events.

4. The method of claim 1, wherein the respective type-specific suppression periods for different message event types are customizable via a user interface.

5. The method of claim 1, wherein events of an exempt event type do not trigger suppression periods.

6. The method of claim 1, wherein the type-specific alert suppression is performed regardless of sender identity.

7. The method of claim 1, wherein the type-specific alert suppression is performed regardless of chat group.

8. The method of claim 1, further comprising detecting the message event type based on message content analysis.

9. The method of claim 1, further comprising allowing user customization of the predefined alert suppression criteria per contact.

10. A system comprising:
one or more computer processor devices; and
memory storing instructions to configure the one or more computer processor devices, when executing the instructions, to perform operations comprising:
providing a push notification service on a user device hosting an application that provides messaging functionality with a plurality of users via a messaging platform associated with said application, the push notification service being configured to automatically generate respective push notification alerts in response to receiving, while the user device is in an inactive mode, notification of predefined alert-triggering events, each push notification alert comprising an audible and/or a tactile indication generated by the user device; and
in an automated operation, dynamically limiting push notification alerts based on predefined alert suppression criteria, such that respective push notification alerts are suppressed for at least some of the events, wherein the alert suppression criteria define a respective type-specific suppression period for each event type in a predefined set of message event types, such that the respective type-specific suppression period for two or more of the predefined set of event types differ in length,
wherein said two or more message event types with different respective suppression periods are selected from the group consisting of: text messages, non-text messages, typing events, status messages, screenshots, and calling events, and
wherein the limiting of push notification alerts comprises:
identifying a particular message event as a suppression trigger event for a particular one of the set of message event types; and
generating a push notification alert for the suppression trigger event; and responsive to identifying the suppression trigger event, performing type-specific alert suppression for a suppression interval that extends for respective predefined type-specific suppression period subsequent to the suppression trigger event, such that push notification alerts are universally suppressed for any message event that is of said particular type and that occurs during the suppression interval.

11. The system of claim 10, wherein a shorter type-specific suppression period applies to non-text messages in the form of media message events than text message events.

12. The system of claim 10, wherein no suppression period applies to calling events.

13. The system of claim 10, wherein the respective type-specific suppression periods for different message event types are customizable via a user interface.

14. The system of claim 10, wherein events of an exempt event type do not trigger suppression periods.

15. The system of claim 10, wherein the type-specific alert suppression is performed regardless of sender identity.

16. The system of claim 10, wherein the type-specific alert suppression is performed regardless of chat group.

17. The system of claim 10, further comprising detecting the message event type based on message content analysis.

18. The system of claim 10, wherein the instructions further configure the one or more computer processor devices to allow user customization of rules the predefined alert suppression criteria per contact.

19. A non-transitory computer readable storage medium storing instructions for causing a machine, when executing the instructions, to perform operations comprising:
at a user device, providing a push notification service with respect to an application that is hosted by the user device and that provides messaging functionality with a plurality of users via a messaging platform associated with said application, the push notification service being configured to automatically generate respective push notification alerts in response to receiving, while the user device is in an inactive mode, notification of predefined alert-triggering events, each push notification alert comprising an audible and/or a tactile indication generated by the user device; and
in an automated operation, dynamically limiting push notification alerts based on predefined alert suppression criteria, such that respective push notification alerts are suppressed for at least some of the events, wherein the alert suppression criteria define a respective type-specific suppression period for each event type in a predefined set of message event types, such that the respective type-specific suppression period for two or more of the predefined set of event types differ in length,
wherein said two or more message event types with different respective suppression periods are selected from the group consisting of: text messages, non-text messages, typing events, status messages, screenshots, and calling events, and
wherein the limiting of push notification alerts comprises:
identifying a particular message event as a suppression trigger event for a particular one of the set of message event types; and
generating a push notification alert for the suppression trigger event; and responsive to identifying the suppression trigger event, performing type-specific alert suppression for a suppression interval that extends for respective predefined type-specific suppression period subsequent to the suppression trigger event, such that push notification alerts are universally suppressed for any message event that is of said particular type and that occurs during the suppression interval.

\* \* \* \* \*

UNITED STATES PATENT AND TRADEMARK OFFICE
CERTIFICATE OF CORRECTION

Page 1 of 1

PATENT NO. : 12,401,728 B2
APPLICATION NO. : 18/525658
DATED : August 26, 2025
INVENTOR(S) : Castro et al.

It is certified that error appears in the above-identified patent and that said Letters Patent is hereby corrected as shown below:

In the Claims

In Column 26, Line 41, in Claim 1, after "and", insert a linebreak

In Column 27, Line 38, in Claim 10, after "and", insert a linebreak

In Column 28, Line 9, in Claim 18, after "of", delete "rules"

In Column 28, Line 47, in Claim 19, after "and", insert a linebreak

Signed and Sealed this
Thirtieth Day of December, 2025

John A. Squires
*Director of the United States Patent and Trademark Office*